United States Patent
Harvill

(10) Patent No.: US 9,852,533 B2
(45) Date of Patent: Dec. 26, 2017

(54) SYSTEM AND METHOD FOR DIGITAL MARKUPS OF CUSTOM PRODUCTS

(71) Applicant: ZAZZLE INC., Redwood City, CA (US)

(72) Inventor: Young Harvill, El Granada, CA (US)

(73) Assignee: Zazzle Inc., Redwood City, CA (US)

( * ) Notice: Subject to any disclaimer, the term of this patent is extended or adjusted under 35 U.S.C. 154(b) by 0 days.

(21) Appl. No.: 15/232,592

(22) Filed: Aug. 9, 2016

(65) Prior Publication Data

US 2017/0046862 A1  Feb. 16, 2017

Related U.S. Application Data

(60) Provisional application No. 62/203,026, filed on Aug. 10, 2015.

(51) Int. Cl.
| | |
|---|---|
| *G06T 11/60* | (2006.01) |
| *G06T 11/00* | (2006.01) |
| *A41H 3/00* | (2006.01) |
| *G06T 3/00* | (2006.01) |

(52) U.S. Cl.
CPC .............. *G06T 11/60* (2013.01); *A41H 3/007* (2013.01); *G06T 3/005* (2013.01); *G06T 11/001* (2013.01)

(58) Field of Classification Search
None
See application file for complete search history.

(56) References Cited

U.S. PATENT DOCUMENTS

| | | | | |
|---|---|---|---|---|
| 6,473,671 B1 * | 10/2002 | Yan | ........................ | A41H 3/007 700/134 |
| 7,657,340 B2 * | 2/2010 | Lind | ...................... | A41H 3/007 345/419 |
| 8,165,711 B2 * | 4/2012 | Brooking | ................ | G06F 17/50 700/132 |
| 8,174,539 B1 * | 5/2012 | Samaniego | ............. | G06T 15/04 345/418 |

(Continued)

OTHER PUBLICATIONS

White et al., "Capturing and Animating Occluded Cloth", ACM Transactions on Graphics, vol. 26, No. 3, Article 34,, dated 2007, 8 pages.

*Primary Examiner* — Barry Drennan
*Assistant Examiner* — Jason Pringle-Parker
(74) *Attorney, Agent, or Firm* — Hickman Palermo Becker Bingham LLP; Malgorzata A. Kulczycka

(57) ABSTRACT

Techniques for generating and using digital markups on digital images are presented. In an embodiment, a method comprises receiving, at an electronic device, a digital layout image that represents a form of a product for manufacturing a reference product; generating a digital markup layout by overlaying the digital markup image over the digital layout image; based on the digital markup layout, generating one or more manufacturing files comprising digital data for manufacturing the reference product; receiving a digital reference image of the reference product manufactured based on the one or more manufacturing files; identifying one or more found markup regions in the digital reference image; based on the found markup regions, generating a geometry map and an interactive asset image; based on, at least in part, the geometry map, generating a customized product image by applying a user pattern to the interactive asset image.

20 Claims, 14 Drawing Sheets

(56) References Cited

U.S. PATENT DOCUMENTS

| | | | | |
|---|---|---|---|---|
| 8,249,738 | B2* | 8/2012 | Lastra | A41H 3/007 |
| | | | | 700/132 |
| 8,571,698 | B2* | 10/2013 | Chen | G01B 11/2513 |
| | | | | 700/135 |
| 9,345,280 | B2* | 5/2016 | Selvarajan | G06T 15/04 |
| 2002/0024517 | A1* | 2/2002 | Yamaguchi | A63F 13/10 |
| | | | | 345/424 |
| 2009/0144173 | A1* | 6/2009 | Mo | G06N 3/006 |
| | | | | 705/26.1 |
| 2009/0295711 | A1* | 12/2009 | Nakamura | G06T 7/596 |
| | | | | 345/156 |
| 2014/0143082 | A1* | 5/2014 | Larson | G06Q 30/0621 |
| | | | | 705/26.5 |
| 2014/0244440 | A1* | 8/2014 | Kim | G06Q 30/0643 |
| | | | | 705/26.61 |
| 2015/0351477 | A1* | 12/2015 | Stahl | G06T 15/04 |
| | | | | 700/132 |
| 2017/0156430 | A1* | 6/2017 | Karavaev | A41H 1/02 |

\* cited by examiner

SYSTEM AND METHOD FOR DIGITAL MARKUPS OF CUSTOM PRODUCTS

BENEFIT CLAIM

This application claims the benefit of provisional application 62/203,026, filed Aug. 10, 2015, the entire contents of which is hereby incorporated by reference as if fully set forth herein, under 35 U.S.C. §119(e).

FIELD OF THE DISCLOSURE

The present invention relates to computer-implemented techniques for using digital markups on digital images for purposes of recognizing surfaces of deformable objects depicted in the digital images, and using the recognized surfaces to apply customized patterns to the deformable objects depicted in the digital images.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Consumer shopping networks and websites form a big sector of the retail market. They strive to provide convenience to consumers; however, they often fall short in providing a true visual representation of customized products. For example, sometimes they are unable to realistically depict various patterns, textures or finishes on digitally customized products such as wearable apparel, toys, furniture, stationaries, and the like.

To increase the realism of customized products displayed digitally, some companies implement markups applied to digital images of the customized products. When a markup is well-described and can be clearly seen on a digitally displayed product, the markup may be easily identified, and thus additional customization of a digital image of the product may be automated. However, when only a small portion of the markup is visible on the displayed product, or the markup is deformed or folded in a complex manner, the markup may be difficult to identify and processing of the markup using automated approaches may be challenging.

SUMMARY

The appended claims may serve as a summary of the invention.

DESCRIPTION OF EXAMPLE EMBODIMENTS

Figure 1:
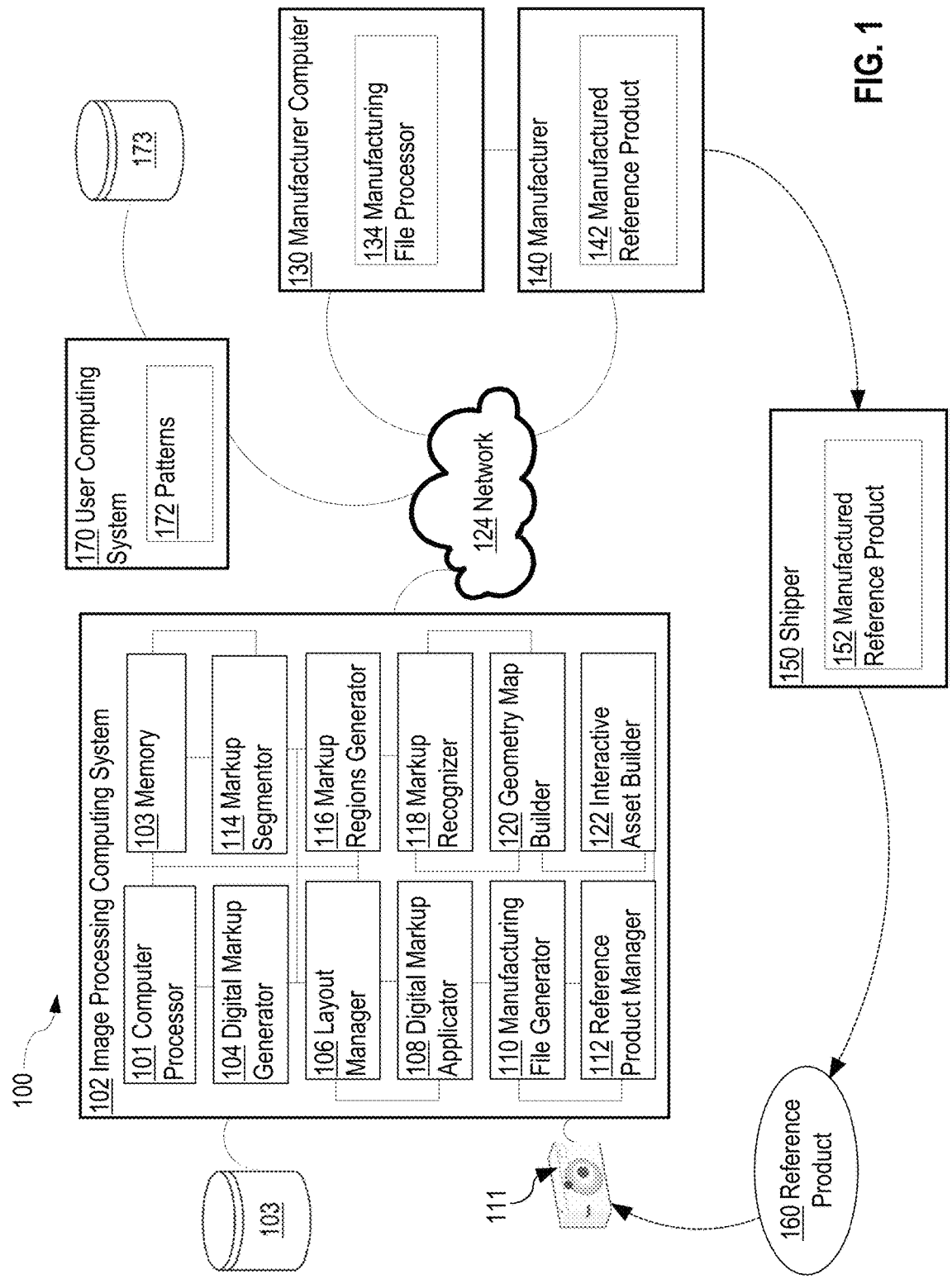
FIG. 1 illustrates an example image processing computing system in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present approach.

Embodiments are described herein according to the following outline:

I. General Overview
  A. Introduction
  B. Overview
II. Structural and Functional Overview
  A. Digital Markup Generator
    1. Digital Markups with Checksums
    2. Digital Markups with Unique Arrangements for Rotations
    3. Digital Markup Identifiers
  B. Digital Markup Storage
III. Applying a Digital Markup to a Digital Layout
  A. Examples of Digital Layouts
  B. Grid-Based Mapping
IV. Generating Manufacturing Files Containing Digital Markups
V. Generating a Digital Reference Image
VI. Segmenting Digital Markups in Digital Reference Images
  A. Segmenting a Digital Markup Using a Color-Filtering Approach
  B. Building a List of Markup Identifiers
  C. Generating a Geometry Mapping
VII. Generating an Interactive Asset Image
VIII. Generating a Customized Product Image
IX. Implementation Example—Hardware Overview

I. General Overview

A. Introduction

In an embodiment, techniques are described for generating digital markups and using the digital markups to generate digital representations of customized products. A digital markup may be for example, a digital image that has a unique pattern or a unique arrangement of digital elements.

The techniques may include applying a digital markup to a digital image, using the marked-up digital image to manufacture a physical reference product, and obtaining a reference image representing a photograph of the manufactured reference product and having the imprinted digital markup. The techniques may also include recognizing surfaces of the digital markup depicted in the reference image, and applying a customized pattern to the surfaces recognized in the reference image. The techniques may be used to process digital images of wearable apparel, toys, and other objects that have components or elements covered with patterns or textures.

The techniques may be implemented in computer-based shopping websites, advertising websites, and other computer-based applications that digitally visualize various products offered in various patterns, textures or finishes. An example implementation may include a website featuring a particular piece of clothing that is available in three different versions: a version with a polka-dotted pattern, a version with a plaid pattern, and a version with a zig-zag pattern. Traditionally, to realistically represent the three version on digital media, a website developer would take three pictures of different mannequins, each mannequin wearing a different version of the particular piece of clothing, and post the three pictures on the website for users to see. Each of the pictures would realistically represent the folds of the clothing and the folds of the patterns on the clothing. However, obtaining three (or more) different pieces of the clothing for each piece of clothing that the website features, and taking three (or more) different pictures for each and every featured piece may be time consuming and expensive. But, the presented techniques allow require obtaining only one piece of clothing and only one picture of the piece. The additional pictures may be generated by applying different patterns to the same picture in such a way that the same deformations of the patterns are depicted on each of the customized images.

In an embodiment, this is accomplished by using digital markups to cut-out forms used by a manufacturer. For example, a digital markup may be applied to a cut-out form used by a manufacturer to produce a particular piece of clothing. Upon receiving a digital image of a picture of a mannequin wearing the marked-up piece of clothing, the digital image may be modified by replacing the markup depicted on the digital image with a customized pattern. The replacement may be performed according to the digital markup depicted on the digital image. Therefore, instead of generating separate pictures of each individual variation of the piece of clothing, only one physical piece and one picture of the piece is needed. The additional pictures showing the same piece of clothing, but having different patterns, textures or finishes, may be generated automatically.

Since it is important to generate a realistic representation of the piece of clothing as it was featured on a mannequin or a person, a digital representation of the piece needs to capture the fact that the piece may be deformed and wrapped around the model's body. In an embodiment, the presented approach allows the capture the deformations and the wrapping of the piece, and allows to realistically reproduce the corresponding deformations of the customized patterns depicted on the customized image of the piece.

B. Overview

In an embodiment, a computer-implemented method comprises receiving, at an electronic device, a digital markup image. The digital markup image may have one or more reference markup regions, and may be associated with a markup identifier. The digital markup image may represent a digital markup that has one or more unique patterns arranged in a unique way or a composition.

In an embodiment, a computer-implemented method comprises receiving a digital layout image that represents a cut-out used to manufacture a reference product. Examples of reference products may include a piece of clothing, a soft toy, a piece of furniture having a cloth upholstery, and the like.

Based on the digital markup image and the digital layout image, a digital markup layout may be generated by overlaying the digital markup image over the digital layout image. This may be performed using an image processing tool that allows projecting the digital markup image onto the digital layout image in such a way so that both images can be seen in the resulting digital markup layout.

In an embodiment, based on, at least in part, the digital markup layout, one or more manufacturing files are generated. The manufacturing files may comprise digital data usable in manufacturing a physical product, also referred to as a reference product. The manufacturing files may be represented in any format that a computer system of the manufacturer can accept and use to control a cutting of a fabric or cloth to form physical pieces of the reference product. Once the reference product is manufactured, a picture is taken of the reference product as it is worn by a model, a mannequin, or used by customers. A digital form of the picture is referred to as a digital reference image.

In an embodiment, a digital reference image of the reference product is received. The digital reference image may be for example, a digital photograph of a model wearing the reference product s manufactured based on the manufacturing files.

Since the reference product, such as a pair of leggings, may appear on the digital reference image as wrapped around the model's body, the digital markup may appear on the digital reference image deformed or cropped. Furthermore, the digital reference image of the reference product may include only a portion of the digital markup image. Therefore, recognizing the digital markup just by visually inspecting the digital reference image may be difficult and not straightforward.

In an embodiment, a digital reference image of a reference product is digitally analyzed, and one or more markup regions, also referred to as found markup regions, are identified in the digital reference image. The found markup regions are the regions that are suspected to correspond to some regions of a digital markup image. Identifying the found markup regions may be performed using various approaches such as image processing and shape recognition techniques described in detail below.

In an embodiment, one or more reference markup regions of a digital markup image used to generate the digital markup layout are retrieved. The one or more reference markup regions are used to determine a region mapping that maps one or more reference markup regions of the digital markup image to one or more found markup regions identified in the digital reference image.

A region mapping is a mapping that maps some of the reference markup regions of the digital markup image onto some of the found markup regions identified in the digital reference image. As described above, since the reference product, such as a pair of leggings, may appear on the digital reference image deformed or cropped, it is possible that only some regions of a digital markup image may be found.

In an embodiment, based on, at least in part, a region mapping, a geometry map is generated. A geometry map may comprise a plurality of polygons generated based on found markup regions. Each of the polygons may correspond to a different portion of the digital markup image, and each of the polygons may capture a deformation of the portion of the digital markup.

In an embodiment, an interactive asset image is generated from a digital reference image. This may be performed by removing markings from the digital reference image and obtaining an unmarked version of the digital reference image. The unmarked version of the digital reference image may be then customized using customized patterns, such as a user pattern, a pattern designed by a manufacturer, or a pattern designed by a web developer. This may include retrieving the customized pattern from a data storage device or a server, and applying the customized pattern to the unmarked version of the digital reference image to generate a customized product image. The customized pattern may be applied in such a way that the customized pattern appears on to be deformed in the same fashion as the markup regions were deformed on the digital reference image.

In an embodiment, a customized product image is displayed on a display device or other display media. For example, the customized product image may be sent to a customer device to cause displaying the customized product image on a display of the customer device. According to another example, the customized product image may be used to generate a new webpage of a web site, and the new webpage may be posted on the web site. According to other example, the customized product image may be sent to a smartphone operated by a user, and the customized product image may be displayed on a display of the smartphone.

In an embodiment, techniques for using digital markups on digital images is implemented using a series of ordered process steps. The steps are intended to illustrate example algorithms that may be implemented using one or more computer.

In an embodiment, techniques for using digital markups on digital images for purposes of recognizing surfaces and applying customized patterns to deformable objects such as wearing apparel are implemented using any type of electronic devices, such as a computer, a workstation, a laptop, a server, a smartphone and other electronic device configured to receive, process and transmit digital images.

In an embodiment, the steps describe an algorithm, process or other outline for how the functions are implemented in programming instructions for a computer. Any suitable programming language or development environment may be used such as JAVA, OBJECTIVE-C, C++, scripting languages, and the like. In practice, an implementation or embodiment will include program instructions for many steps other than those listed herein, but the specific listings of steps nevertheless indicate the algorithmic information sufficient to communicate to a skilled programmer or software engineer how to implement the specified functions in complete working code.

In an embodiment, techniques are implemented in a digital marker computer processing ("DMCP") system. The DMCP may generate digital markers that have certain characteristics that provide information needed to solve a task of mapping markup on a variety of manufactured surface, such as apparel. In the DMCP, the pattern of the digital markup itself can provide or improve the marker coordinate frame, and the pattern itself may characterize a local surface deformation or curvature.

In one embodiment, the steps to build, apply and recognize the DMCP comprise defining digital markups, defining digital markup identifiers, applying a digital markup to a digital layout and generating one or more manufacturing files containing digital markups. Once a reference product is manufactured based on the manufacturing files, a region mapping and a geometry mapping are generated. The mappings are used to generate an interactive asset image, which is then used to generate a customized product image by applying a customized pattern to the interactive asset image.

II. Structural and Functional Overview

FIG. 1 illustrates an example image processing computing system in which an embodiment may be implemented. In an embodiment, an example image processing computing system 102 is implemented in a computing environment 100. Image processing computing system 102 may be configured to generate digital markups and use the digital markups to generate digital representations of customized products. Image processing computing system 102 may generate a plurality of digital markup images, each digital markup image having a unique pattern or a unique arrangement of digital elements.

In an embodiment, image processing computing system 102 is configured to apply a digital markup to a digital image, use the marked-up digital image to manufacture a physical reference product, obtain a reference image representing a photograph of the manufactured reference product and having the imprinted digital markup, recognize surfaces of the digital markup depicted in the reference image, and apply a customized pattern to the surfaces recognized in the reference image.

In an embodiment, image processing computing system 102 comprises one or more computer processors 101 configured to execute program instructions stored in one or more memory units 103. Image processing computing system 102 may also include one or more of: a digital markup generator 104, a layout manager 106, a digital markup applicator 108, manufacturing file generator 110, a reference product manager 112, one or more memory units 103, a markup segmenting unit 114, a markup regions generator 116, a markup recognizer 118, a geometry map builder 120, or an interactive asset builder 122.

In an embodiment, digital markup generator 104 is programmed or configured to generate a plurality of digital markup images. A digital markup image may be any type of a digital image that has a unique pattern or a unique arrangement of digital elements.

In an embodiment, digital markup generator 104 is programmed or configured to determine a checksum for a digital markup image. Digital markup generator 104 may also be configured to generate a plurality of digital pattern images that have the checksum embedded in each digital pattern image. A checksum may be a count of rows (and columns) in an individual digital pattern of a digital markup image. Based on the plurality of digital pattern images, digital markup generator 104 may generate a plurality of rotated digital pattern images, select a subset of the plurality of rotated digital pattern images, and generate the digital markup image based on the subset of the plurality of rotated digital pattern images.

Digital markup generator 104 may also be programmed or configured to generate a markup identifier for a digital markup image. A markup identifier may be generated based on contents of the digital markup image. A markup identified may be stored along with the digital markup image in a markup index data structure.

In an embodiment, layout manager 106 is programmed or configured to receive a digital markup image that has one or more reference markup regions, and is associated with a markup identifier. Layout manager 106 may also be configured to receive a digital layout image that represents a form of a product used to manufacture a reference product.

In an embodiment, digital markup applicator 108 is programmed or configured to generate a digital markup layout by overlaying the digital markup image over the digital layout image. This may be performed using an image processing tool that allows overlaying the digital markup image over the digital layout image so that both images can be seen in the resulting digital markup layout.

In an embodiment, manufacturing file generator 110 is programmed or configured to generate one or more manufacturing files based on, at least in part, a digital markup layout. The one or more manufacturing files may comprise digital data usable in manufacturing the reference product. For example, manufacturing file generator 110 may be programmed or configured to scan a digital markup layout to generate a scanned file, and modify the scanned file by adding program instructing for using the scanned digital markup layout to generate physical components of the physical reference product.

A scanned file may be sent to a manufacturer and downloaded on a computer system operated by the manufacturer. Upon receiving the scanned file, the computer system operated by the manufacturer may initiate generating one or more physical components of a physical reference product. The component then may be assembled into the reference product.

In an embodiment, reference product manager 112 is programmed or configured to receive a digital reference image of a physical reference product that has been manufactured based on, at least in part, one or more manufacturing files.

In an embodiment, markup segmenting unit 114 is programmed or configured to determine a plurality of distinct regions in a digital layout image, and determine whether any of the distinct regions of the plurality of distinct regions contains at least a portion of a digital markup image.

Markup segmenting unit 114 may also be programmed or configured to segment a digital reference image into one or more found markup regions by performing one or more of: applying a color shed approach to the digital reference image, determining distance values between color values in areas of interest in the digital reference image and color values in a reference photograph, generating a spatial frequency histogram for the digital reference image, or generating a bandpass histogram for the digital reference image.

In an embodiment, markup regions generator 116 is programmed or configured to identify, based on a plurality of distinct regions, one or more found markup regions in a digital reference image that potentially include a digital markup image.

In an embodiment, markup recognizer 118 is programmed or configured to determine a region mapping that maps one or more reference markup regions to one or more found markup regions.

In an embodiment, geometry map builder 120 is programmed or configured to generate a geometry map based on, at least in part, a region mapping.

In an embodiment, interactive asset builder 122 is programmed or configured to generate an interactive asset image by removing marking in one or more found markup regions of a digital reference image.

Interactive asset builder 122 may also be programmed or configured to generate a customized product image based on, at least in part, a region mapping and a geometry map. A customized product image may be generated by applying a user pattern to an interactive asset image. Interactive asset builder 122 may also be configured to cause the customized product image to be displayed on a display device.

Besides image processing computing system 102, computing environment 100 may also include one or more storage devices 103 accessible to the image processing system 102.

Computing environment 100 may also include a digital camera 111 configured to capture digital images of reference products and provide the digital images to image processing computer system 102.

Computing environment 100 may also include one or more user computing systems 107 that may communicate with image processing computing system 102 via a communication computer network 120. A user computing system 107 may be configured to store images representing patterns, textures and finishes in internal storages 172 and/or external storage devices, such as a storage device 173.

Computing environment 100 may also include one or more manufacturer computers that may have one or more manufacturing file processors 124. Manufacturing file processors 134 may be configured to receive manufacturing files from image processing computing system 102, and use the manufacturing files to control manufacturing equipment to manufacture physical parts of a physical reference product 142 and to assembly the parts into reference product 142. The manufacturing equipment may be maintained by a manufacturer 140.

Computing environment 100 may also include shipping services 150 that allow receiving reference product 142 from manufacturer 140, and ship, or otherwise deliver, reference product 142 to image processing computing system 102. Upon receiving reference product 142, a camera 111 may be used to take a picture of reference product 142, and a digital reference image of the reference product may be provided to reference product manager 112.

A. Digital Markup Generator

Digital markup generator 104 is configured to generate digital markups. Digital markups are generally applicable to any kind of printable deformable surface, including all kinds of wearing apparel, shoes, textiles such as bedding, plush toys, and the like.

For purposes of illustrating an example of a digital marker, certain embodiments are explained with reference to wearing apparel, such as a pair of leggings; however, the disclosure is not limited to implementations for the wearing apparel. A pair of leggings is a type of apparel worn on the legs and hips. Due to its structure and purpose, the leggings wrap around the legs and hips. The wrapping may be represented or captured using a deformable surface. In an embodiment, a digital marker may be placed on any type of a surface, including a deformable surface. Using the presented approach, the coordinates and deformation parameters of the marker may be found for any type of the surface.

A digital markup may be applied to cut-outs or layouts of clothing materials used to assembly a piece of clothing. Once the piece of clothing is assembled, the piece of clothing may have the digital markup imprinted on it. The piece of clothing may be put on a mannequin or a model, and photographed using a camera. The photograph may be then processed to recognize the digital markup on the photograph, and the recognized markup may be used to determine a geometry map of the surface on which the markup is present. The geometry may be used to generate an unmarked digital image, and a custom pattern may be applied to the unmarked digital image to generate an interactive asset depicted the piece of clothing having the customized pattern.

In an embodiment, a digital markup is a digital markup image that has certain properties that distinguish the digital markup from other digital markups. A digital markup may comprise one or more digital patterns, also referred to as elements. Each digital patterns may be encoded as an array of bits in a regular pattern that has even intervals between elements. For example, a digital pattern may be encoded as a set of 4×4 dots. If a digital pattern is encoded using a set of 4×4 dots, then the total number of possible patterns is 16.

Figure 2:
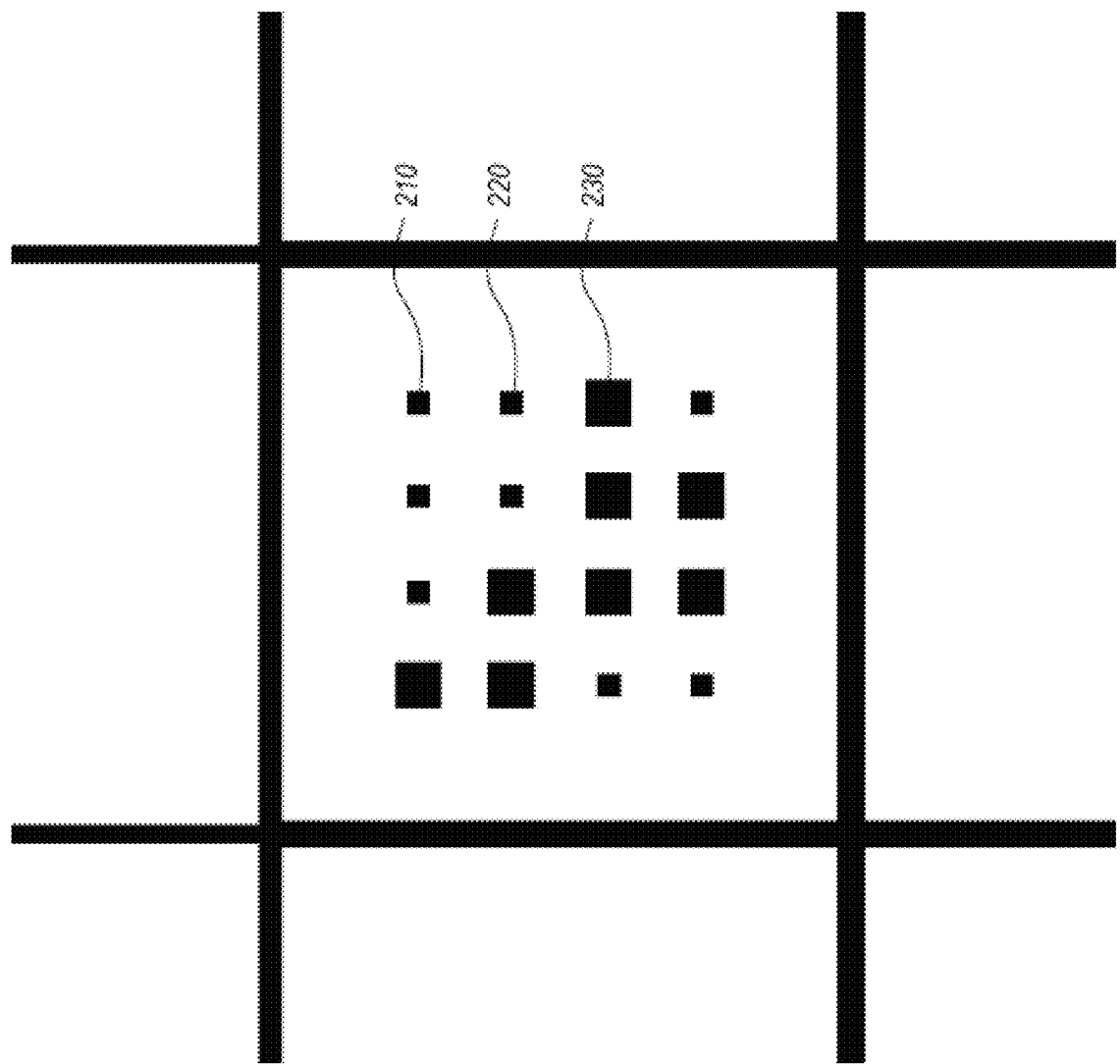
FIG. 2 illustrates an example marker element of a digital markup image.

FIG. 2 illustrates an example marker element of a digital markup image. In the depicted example, a marker element has four rows and four columns storing dots that are either large dots or small dots. For example, dots 210 and 220 are small dots, while a dot 230 is a large dot. The large dots may correspond to a bit set to 'true,' while the small dots may correspond to a bit set to 'false.'

In an embodiment, a digital pattern or element may be represented by a sequence of bits corresponding to dots depicted in the digital pattern. A large dot may be represented by 'one' or 'true.' A small dot may be represented by 'zero' or 'false.'' Hence, a bit may be set to 'true' by making the dot larger, or 'false' by making the dot smaller. The size change may be determined by the best recognizable separation between elements, and the best recognizable scale for determining a 'true' state or a 'false' state.

In an embodiment, a digital pattern may be represented by a value of a vector that represents the pattern. The value of an encoded binary number in the markup is limited by $0 \ldots 2^n$ In embodiment, a count of elements in a digital pattern set to 'true' may be limited to n/2 to embed a checksum in the markup.

Binary numbers encoded in a markup that match a number with a lower value if its array of elements is rotated by 90 degrees are used to embed rotation in the markup, rather than as separate markup numbers.

Figure 3:
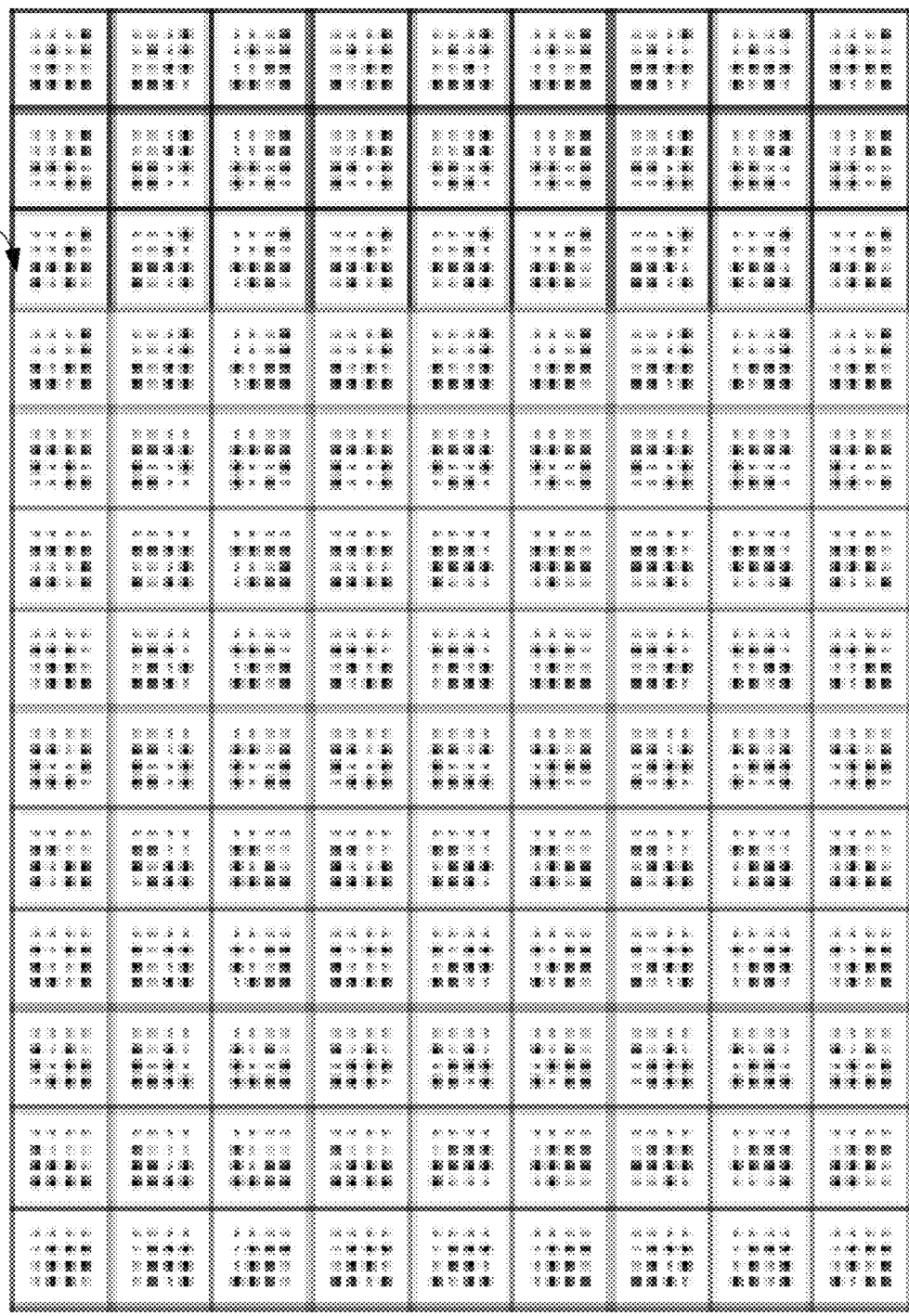
FIG. 3 illustrates an example digital markup image.

FIG. 3 illustrates an example digital markup image. The depicted digital markup image 310 includes a plurality of digital patterns arranged in a table having a certain number of rows and columns. The digital patterns are selected in such a way that non two digital patterns from the plurality of digital patterns are identical. Since no two digital patterns in the plurality of digital patterns in the digital markup image are identical, the arrangement of the plurality of digital patterns in the digital markup image is unique.

1. Digital Markups with Checksums

In an embodiment, a digital markup image has a checksum. A digital checksum is the number of large dots in a 4×4 pattern. For instance, a checksum of 8 would mean that the digital markup is that subset of 4×4 patterns that have 8 large dots and 8 small dots.

In an embodiment, a checksum is determined before a digital markup is generated and it is used as a parameter for generating the digital markup image. A checksum need not be actually represented by a number included in the digital markup image. Instead, a checksum is known for the digital markup image before the image is generated.

2. Digital Markups with Unique Arrangements for Rotations

In an embodiment, a digital markup image is created in such a way that a markup pattern is distributed across individual markers.

Figure 11:
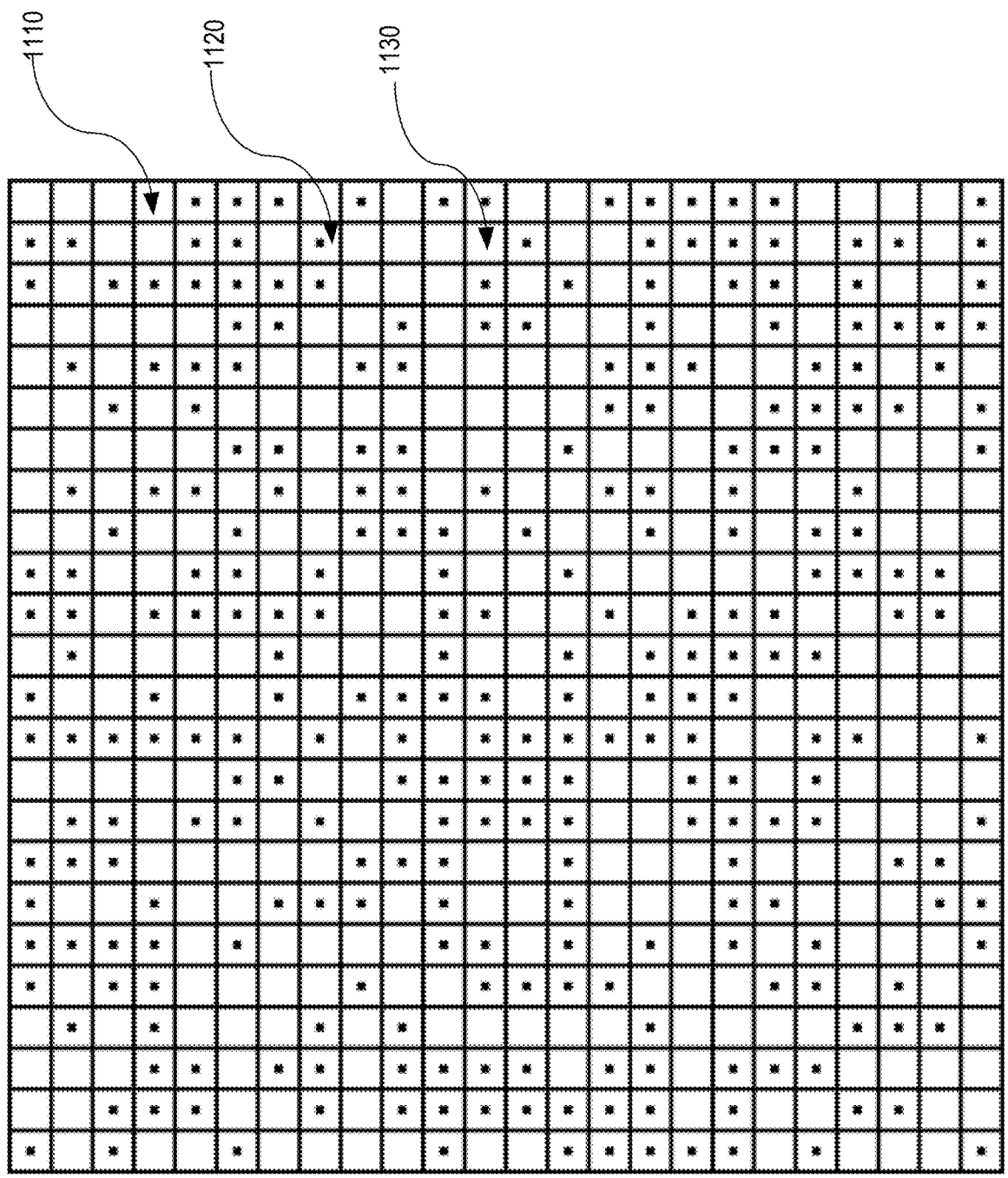
FIG. 11 illustrates an example digital markup image having a markup arrangement of dots that is unique for rotations by 0, 90, 180, 270 degrees.

FIG. 11 illustrates an example digital markup image having a markup arrangement of dots that is unique for rotations by 0, 90, 180, 270 degrees. In the depicted example, a digital markup image comprises a plurality of digital markup patterns, wherein each digital markup pattern is a 4×4 element that has a unique arrangement of dots for each of rotations of 0, 90, 180, and 270 degrees. The pattern is designed so that no 4×4 sub-area is used in any other 4×4 sub-area of the design in any of the 4 rotations. Therefore, a design of 24×24 elements may use 21×21 or 441 unique overlapping 4×4 sub-designs. Using such arrangements reduces the image resolution required to encode the design. Since the ability to generate a design having unique elements in each of rotations of 0, 90, 180 and 270 degrees, the size limit for the design with this kind of 4×4 uniqueness is 127×127.

3. Digital Markup Identifiers

In an embodiment, a markup has an associated markup identifier, which is referred to as a MarkupID herein for convenience, although other embodiments may use other designations. A markup identifier may be generated based on a binary number corresponding to a value of the vector obtained from a markup pattern. One approach for generating a markup identifier is to use a binary vector built based on the content of the markup. For example, a digital markup pattern may be represented as a binary string, the binary string may be converted to a binary value, the binary value may be used to generate a vector, and the vector may be used as a MarkupID of the digital markup pattern.

In an embodiment, markup identifiers are generated based on ordinal values. The ordinal values may be generated and used to index a markup index, also referred to as a MarkupIndex herein for convenience, although other embodiments may use other designations. For example, a MarkupID for a particular digital markup may be assigned a next available ordinal value in a MarkupIndex.

The manner in which markup identifiers are created and used to index a MarkupIndex may be encoded as software code such as C++ code. For example, a C++ object may be created that includes instructions which, when executed, cause generating MarkupIDs and a MarkupIndex.

A process of creating digital markup identifiers for digital markups and digital markup index may include digitally creating and storing, in computer storage, a list of MarkupIDs based on the properties of the digital markups. For example, a particular MarkupID for a particular digital markup may be created based on either a value of the digital markup vector or a next available ordinal value in a MarkupIndex.

The process may also include building a mapping from a MarkupIndex to MarkupIDs. This process may be performed in either direction. For example, if the MarkupIDs are created based on the markups' vectors, then the MarkupIDs may be used to generate the MarkupIndex, and then the mapping. However, if a sequence of ordinary numbers is used to generate a MarkupIndex, then the ordinary numbers may be used to generate the MarkupIndex, and the ordinary numbers may be assigned to digital markups as the MarkupIDs.

In an embodiment, a MarkupID associated with a markup includes information about rotations applicable to the markup image. For example, if a digital markup image is generated in such a way that its elements are unique in a rotation by for example, 90 degrees, then the MarkupID generated for the digital markup image may include not only the information about a markup pattern of the digital markup, but also the information about the rotation. Alternatively, the rotation information may be stored separately from the MarkupID. For example, the rotation information may be associated with the MarkupID.

In an embodiment, if a rotation value is included in a MarkupID for a particular digital markup image, then a process of creating digital markup identifiers includes a method for returning the rotation value for the particular digital markup. If the rotation value is a MarkupID, then returning value for the particular digital markup would include returning the rotation value. However, if the rotation value is not included in the MarkupID, then two separate queries may be issued: one to request a rotation value and another to request the MarkupID.

B. Digital Markup Storage

In an embodiment, digital markup images may be stored in a storage device, such as device 103 depicted in FIG. 1. The storage device may store the digital markup images using any type of data organization. For example, the digital markup images may be stored in association with a MarkupIndex and in association with any additional information if such as available or provided.

III. Applying a Digital Markup to a Digital Layout

Figure 12:
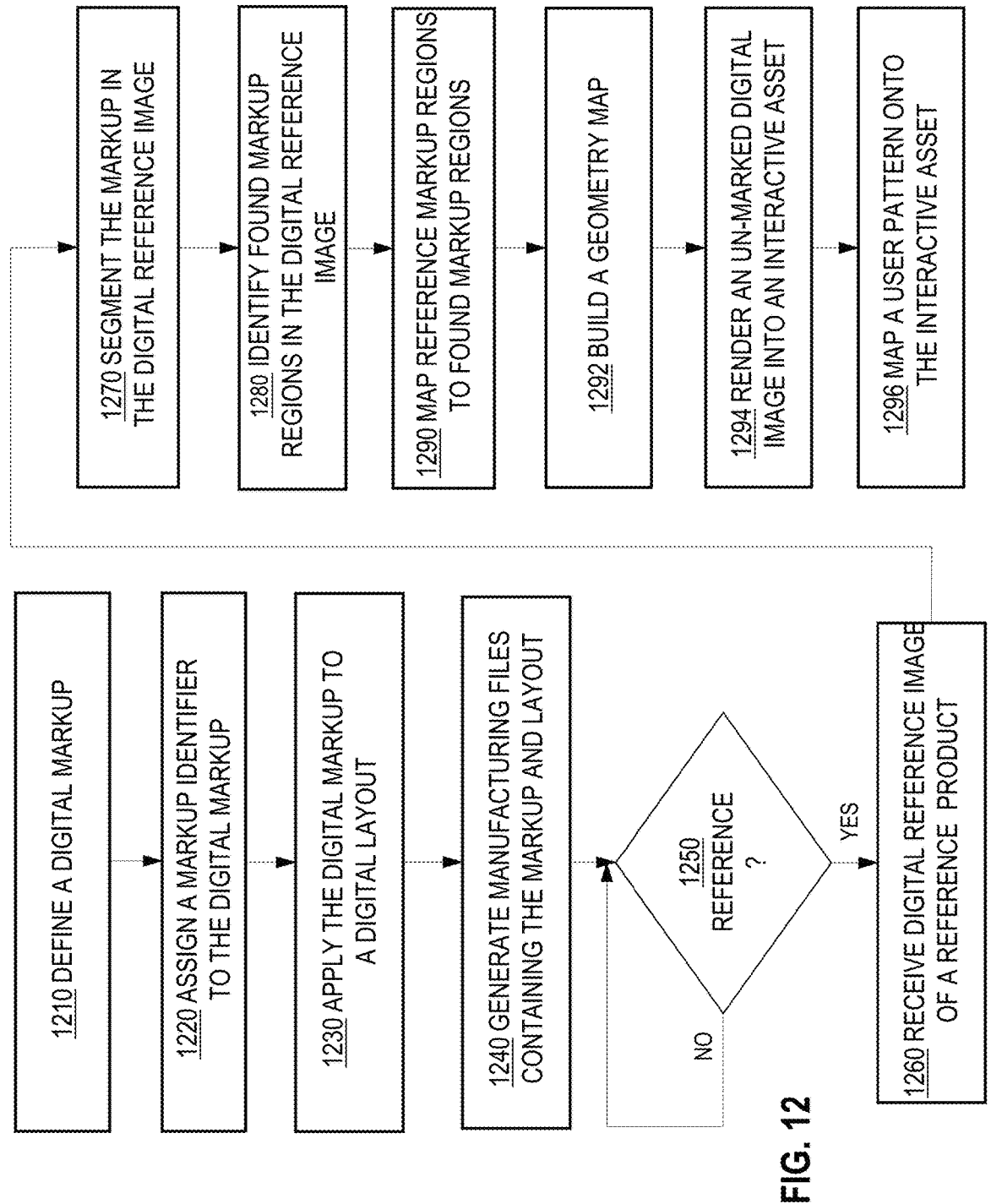
FIG. 12 illustrates an example process for using digital markups on digital images for the purpose of recognizing markup regions in digital reference images and applying customized patterns to deformable objects.

FIG. 12 illustrates an example process for using digital markups on digital images for the purpose of recognizing markup regions in digital reference images and applying customized patterns to deformable objects.

In step 1210, one or more digital markups are defined. Digital markups may be defined in advance. If two or more digital markups are defined, then the digital markups are defined in such a way that no two, of the two or more digital markups, are identical. Examples of digital markups are described in FIG. 3 and FIG. 11.

In an embodiment, a digital markup is defined by generating a unique arrangement of dots of different sizes. The unique arrangement may be represented in a digital markup image. A digital markup image may be stored using any data format, including the formats such as mpeg, jpeg, pix, and the like.

In step 1220, markup identifiers are assigned to digital markups. Assigning a markup identifier to a digital markup image may include generating a MarkupID based on a value of the vector representing the digital markup image, and assigning the value as the MarkupID of the digital markup image.

Referring again to FIG. 12, in step 1230, a digital markup image is applied to a digital layout image. Applying a digital markup image to a digital layout image may be implemented using an automated approach that automatically fits the digital markup image to the digital layout image, or overlays the digital markup image over the digital layout image. As described above, a digital markup image may be a digital image that represents a unique combination of dots, or squares, that have different sizes, and each of the dots, or squares, represents either the binary '1' or the binary '0.'

A. Examples of Digital Layouts

A digital layout image may be a digital image representing a physical cut-out or a physical form that a manufacturer may use to cut physical pieces of for example, a cloth, a piece of garment, or a toy, that later may be assembled into a physical product. Examples of digital layout images are described in FIG. 4.

Figure 4:
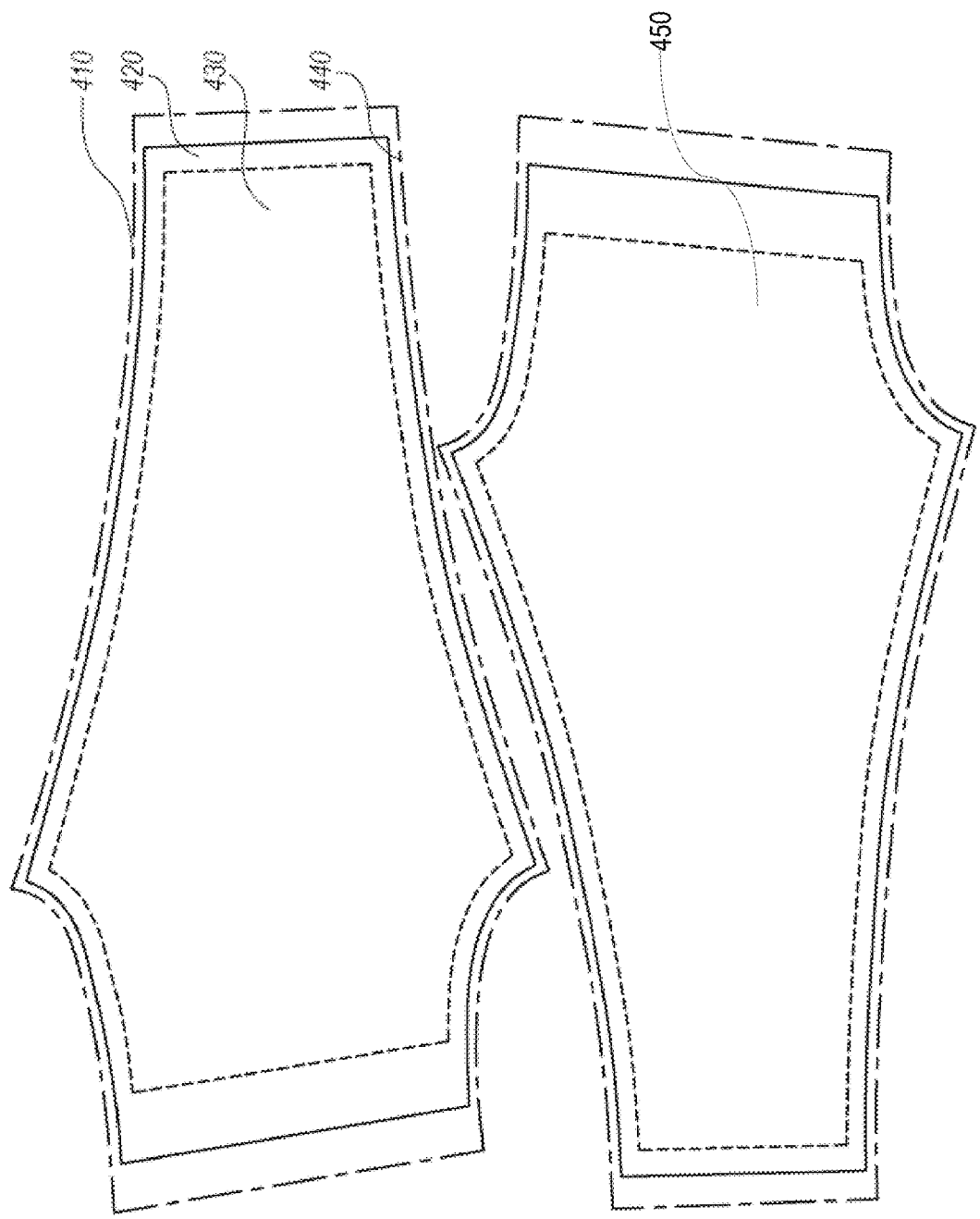
FIG. 4 illustrates example digital layout images.

FIG. 4 illustrates example digital layout images. The depicted example digital layout images include two images: a digital layout image 430 and a digital layout image 450. Both images represent physical cut-out forms that may be used by a manufacturer, or a seamstress, to cut out pieces of fabric to assembly for example, a pair of leggings.

A cut-out form usually has certain markings imprinted on it. The certain markings may include several different types of lines, and a count of the different lines depicted in the cut-out form depends on the preferences implemented by a manufacturer. For example, the markings may represent leading lines for cutting the fabric, leading lines for stitching the fabric, and/or leading lines beyond which neither cutting nor stitching could be performed.

In the example depicted in FIG. 4, a digital layout image 430 represents a cut-out form that has three types of markings. One marking, depicted using a broken line 410, indicates a cut-out line. This line is to be followed to cut a fabric. Another marking, depicted using a solid line 420, indicates a stitch line which is to be followed by a sewing machine to assembly the garment. Other marking, depicted using a dashed line 440, indicates a safe line beyond which neither cutting nor stitching should be performed.

B. Grid-Based Mapping

In an embodiment, a digital markup image is applied to a digital layout image provided by a manufacturer or a seamstress. Applying a digital markup image to a digital layout image may be performed by overlaying the digital markup image over the digital layout image in such a way that an outline of the digital markup image follows an outline of the digital layout image as much as possible. By overlaying a digital markup image over a digital layout image, a digital markup layout is generated.

Since a digital markup image has usually a rectangular shape and a digital layout image rarely has a rectangular shape, overlaying the digital markup image over the digital layout image in such a way that the corresponding outlines follow each other as much as possible may involve stretching some areas of the digital markup image. The overlaying and the stretching may be performed using various techniques. One technique may involve dividing the digital overlay image into a grid, and mapping the elements of the digital markup image onto the grid identified in the digital overlay image.

In an embodiment, a digital layout image is divided into a grid comprising a plurality of grid elements. A grid element may have any type of shape, not necessarily a rectangular shape. A size of the grid may be determined based on a size of the digital markup image, a resolution of the manufacturing process, a size of the digital layout image, and/or a size of the physical reference product that will be assembled based on a cut-out form represented by the digital layout image. Elements of the grid are also referred to as distinct regions of the digital layout image.

In an embodiment, for each separate and distinct region in a digital layout image, a size of a markup unit is set. Also, a size of an enclosing boundary or a grid element may be set based on a resolution of a manufacturing process and a size of the resulting physical product. For example, if the resulting product is a small product, such as a case of a cell phone, a grid size may be set to 1 cm; however, if the resulting product is a large product, such as a shirt, then a grid size may be set to 2.5 cm, or so. The size of the grid may be adjusted or modified if the initial size of the grid is too small or too large.

Furthermore, for each separate and distinct region in a digital layout image, an offset or border of a markup is set within a grid element.

In an embodiment, for each separate and distinct region in a digital layout image, a color of the color of the markup. A color may be set based on the instructions provided by a manufacturer or based on a technique used to detect the markup during the manufacturing process and/or by a system that will be used to process a photograph of a resulting physical product. The color may be also set based on the capabilities of the processing system so that the markup can be removed from the photograph of the resulting physical product. In one embodiment, the color is set to yellow, and the markup is printed on the resulting physical product at 30% yellow for a color segmentation.

In an embodiment, a width and a height of the grid is set. The width and the height may be set in such a way so that the grid can over the entire region of a digital layout image to be marked using a digital markup image.

In an embodiment, a grid is generated according to the setting described above. The grid may be placed, or overlaid over a digital layout image. The grid may be simply projected onto a digital layout image, or a rotated or wrapped in such a way that there is a continuity of the grid across the corresponding seams joining the respective regions. An example of a digital marker image overlaid over a digital layout image is described in FIG. 5.

Figure 5:
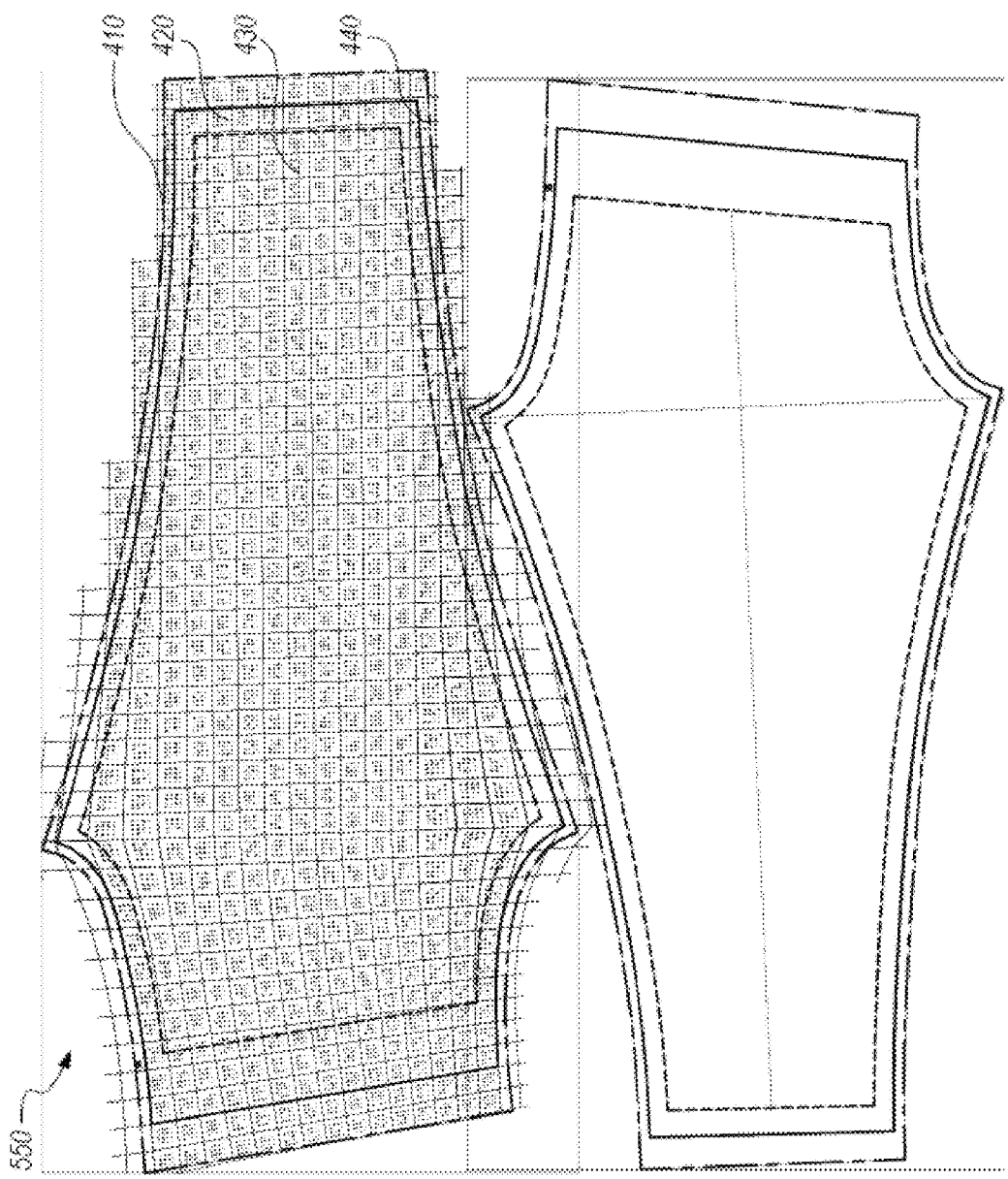
FIG. 5 illustrates an example of overlaying a digital markup image over a digital layout image.

FIG. 5 illustrates an example of overlaying a digital markup image over a digital layout image. The depicted example depicts two digital layout images: a digital layout image 430 and a digital layout image 450. Both images represent physical cut-out forms that may be used by a manufacturer, or a seamstress, to cut out pieces of fabric to assembly for example, a pair of leggings.

Both digital layout image 430 and digital layout image 450 have three types of markings. One marking, depicted using a broken line 410, indicates a cut-out line. This line is to be followed to cut a fabric. Another marking, depicted using a solid line 420, indicates a stitch line which is to be followed by a sewing machine to assembly the garment. Other marking, depicted using a dashed line 440, indicates a safe line beyond which neither cutting nor stitching should be performed.

In FIG. 5, digital layout image 430 is used to illustrate overlying 550 a digital markup image over a layout image. As shown in FIG. 5, a grid is placed onto digital layout image 430, and a digital markup image is projected, or overlaid, onto the grid of digital layout image 430. In this example, the grid is stretched along the widest portion of digital layout image 430. In other examples, the grid may be rotated, wrapped, or otherwise deformed to allow for continuity across seams that would be used to join individual pieces of fabric to assembly a physical product.

In the example depicted in FIG. 5, a digital markup image does not extend to the entire perimeter of a digital layout image. This may be recommended to preserve a scale of the design. For example, if the digital layout image represents a cut-out form of a pair of leggings, then a scale of the markup pattern in for example, the vertical directions of the leggings may be preserved. If the design layout image represents a cut-out form of a fitted shirt, then a scale of the design in for example, a horizontal direction of the shirt may be preserved.

A grid-based approach for overlaying a digital marker image over a digital layout image while preserving a scale of the design in at least one direction may be appropriate for various products in which depicting the design in the correct scale matters. For this products, this approach may be more appropriate than for example, fitting the pattern to the exact edge. If a uniform scale is more important than the ability to tile a pattern across the edge, then fitting the pattern to the exact edge may be undesirable. Referring again to the example of a pair of leggings, it may be desirable to map a digital markup image onto a digital layout image in such a way so that at least some patterns will appear continuously across both legs.

Figure 6:
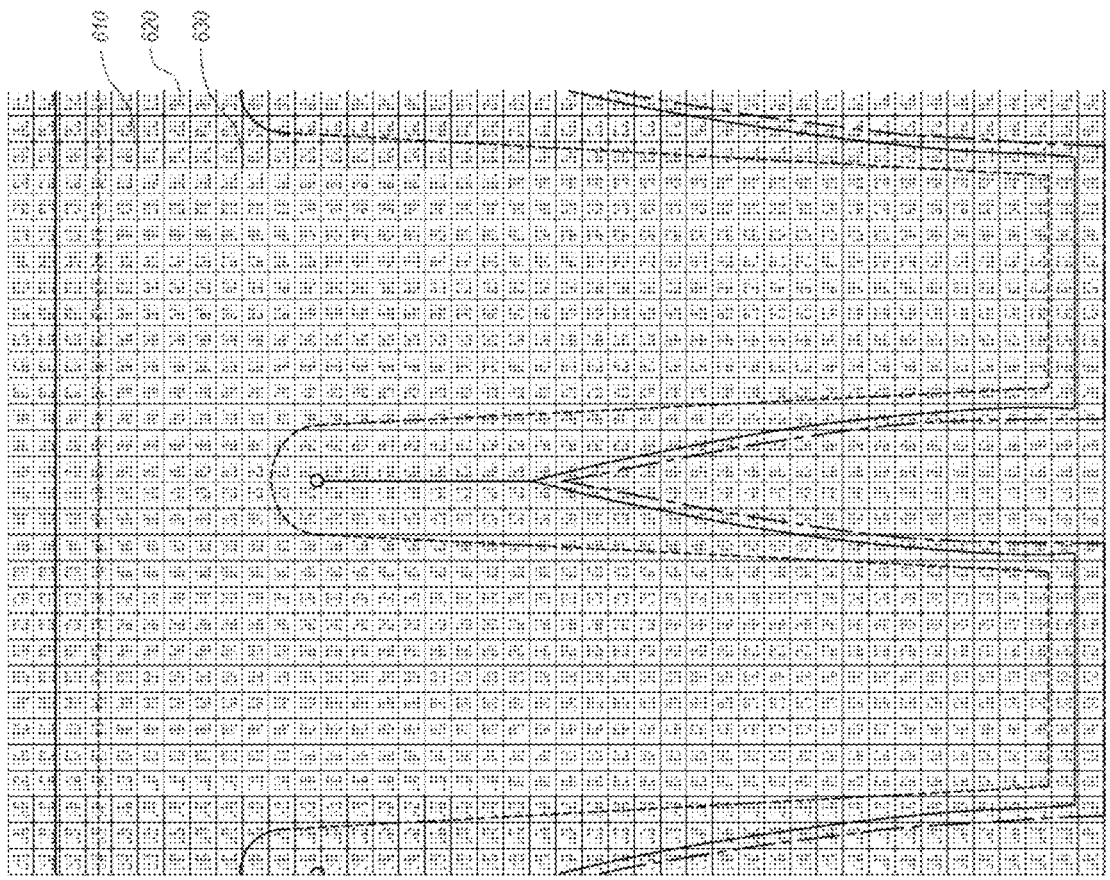
FIG. 6 illustrates an example design area that shows a digital markup image overlaid over a digital layout image and that is displayed to a user in a graphical user interface.

FIG. 6 illustrates an example design area that shows a digital markup image overlaid over a digital layout image and that is displayed to a user in a graphical user interface. The example depicts the design area for a pair of leggings. To illustrate an example, a lower portion of the legging has been cropped.

In the depicted example, a digital layout image represents a cut-out form that has three types of markings. One marking, depicted using a broken line 610, indicates a cut-out line. This line is to be followed to cut a fabric. Another marking, depicted using a solid line 620, indicates a stitch line which is to be followed by a sewing machine to assembly the garment. Other marking, depicted using a dashed line 630, indicates a safe line beyond which neither cutting nor stitching should be performed.

As it may be gleaned from FIG. 6, a digital markup image is overlaid over a digital layout image in such a way that the pattern of the digital markup overlaps itself in the center of the example design area. When the pattern is printed on the fabric, it is masked by the cut lines.

IV. Generating Manufacturing Files Containing Digital Markups

In step 1240, one or more manufacturing files are generated based on a digital markup layout. A digital markup layout may be a digital image obtained by overlaying a digital markup image over a digital layout image. If the digital markup layout is obtained by overlaying the digital markup image over the digital layout image, then the digital markup layout include at least a portion of the digital markup imprinted on the digital layout.

Manufacturing files are digital files that provide at least a digital markup layout. Manufacturing files may also include instructions that specify the details for cutting physical components out of fabric, or other material, and the details for processing the components to assembly the components into a physical reference product. Manufacturing files may be represented in any format that a computer system of a manufacturer can accept and process.

Manufacturing files may be generated based on a digital markup layout and based on settings used by a software application used to overlay a digital markup image over a digital layout image. This may be performed automatically by selecting one or more settings from a graphical user interface displayed by a software application used to generate a digital markup layout. This may also be performed manually by having a user select a digital markup layout and embedding instructions for processing the digital markup layout. For example, using a graphical user interface, a user may select a digital markup layout, and request generating a manufacturing file based on the digital markup layout.

In an embodiment, one or more manufacturing files are transmitted to a computer system of a manufacturer. The files may be transmitted via any type of communications connection and any type of communications network.

Upon receiving one or more manufacturing files, an employee of a manufacturer may print out a digital markup layout on a substrate. For example, if the digital markup layout is intended for a manufacturing a piece of clothing, then the digital markup layout may be printed on a cloth or a fabric.

Once a digital markup layout is printed on a substrate, the substrate may be cut into pieces that are to be used to assembly a physical reference product. The cutting may be performed manually or automatically. For example, an employee may use the digital markup layout printed on a cloth, and cut the cloth along the cutting lines, such as line 610 in FIG. 6.

If instructions for cutting a substrate are included in a manufacturing file provided to a manufacturer, then the instructions may be used by either an employee or by a computer system of the manufacturer to perform the cutting to obtain one or more components of a physical reference product.

Once one or more components of a physical reference product are cut, or otherwise obtained, the components are assembled into the physical reference product. For example, the pieces may be sewn together to form a pair of leggings. The pair of legging will have a digital markup imprinted on the leggings.

In step 1250, a test is performed to determine whether a physical reference product has been received from a manufacturer or a shipper. If the physical reference product has been received, then step 1260 is performed. Otherwise, the test in step 1250 is repeated.

In some situations, a physical reference product is not received from a manufacturer because one or more manufacturing files generated based on a digital markup layout were corrupted or had some errors. In such situations, steps 1230-1250 may be repeated so that new manufacturing files are generated, and a physical reference product is created and provided.

V. Generating a Digital Reference Image

In an embodiment, a reference product is received from a manufacturer or a shipper facilitating delivery of the reference product. A reference product is typically a physical product manufactured based on manufacturing files provided to a manufacturer.

In step 1260, a digital reference image is generated based on a reference product. A digital reference image may be a photograph of a reference product. Depending on a nature of the reference product, the product may be featured on a model, a mannequin, a stand, or in any other arrangements appropriate for demonstrating the reference product. For example, if a reference product is a pair of leggings, then the leggings may be put on a mannequin, and a photograph of the mannequin wearing the leggings may be taken. If a reference product is a piece of furniture with a cloth upholstery, then the piece of upholstered furniture may be features in a showroom or in a private house.

In an embodiment, a reference product may be provided with instructions specifying how the reference product is to be featured, lit, illuminated, or otherwise processed. The instructions may by encoded in a code provided along with the reference product. The instructions may also be obtained from a server, a cloud system or other computing system.

Instructions that accompany a reference product may specify a rig to be used to photograph the reference product. The instructions may also specify the method that was used to process digital process markups imprinted in the reference product. Furthermore, the instructions may include suggestions for placing, illuminating and arranging the reference product to product a high quality photograph of the reference product. The instructions may also specify a position of the camera, a position of the light sources illuminating the reference product, and locations of other elements that may enhance the quality of the photograph of the reference product.

In an embodiment, a reference product is placed in an automated photographic system. The manner in which the reference product is placed in the system may be specified by instructions associated with the reference product, or by a photographer or a designer. For example, the reference product may be placed on a stand, a fixture, or a mounting configured to support the reference product.

In an embodiment, a reference product placed in an automated photographic system is illuminated using one or more light sources or any type of lighting. The type of lighting and the positioning of the lighting may be specified in the instructions that accompany the reference product, by a photographer or by a designer.

In an embodiment, one or more photographs are taken of a reference product. A photograph may be taken using any type of camera. For example, the photograph may be taken using a digital camera which is configured to capture digital images. The photograph may also be taken using an analog camera. In this case, a photograph taken using an analog camera may be digitally scanned, and a digital image may be generated from the photograph. The obtained digital images are referred to as digital reference images, and may be stored in a storage device.

Figure 7:
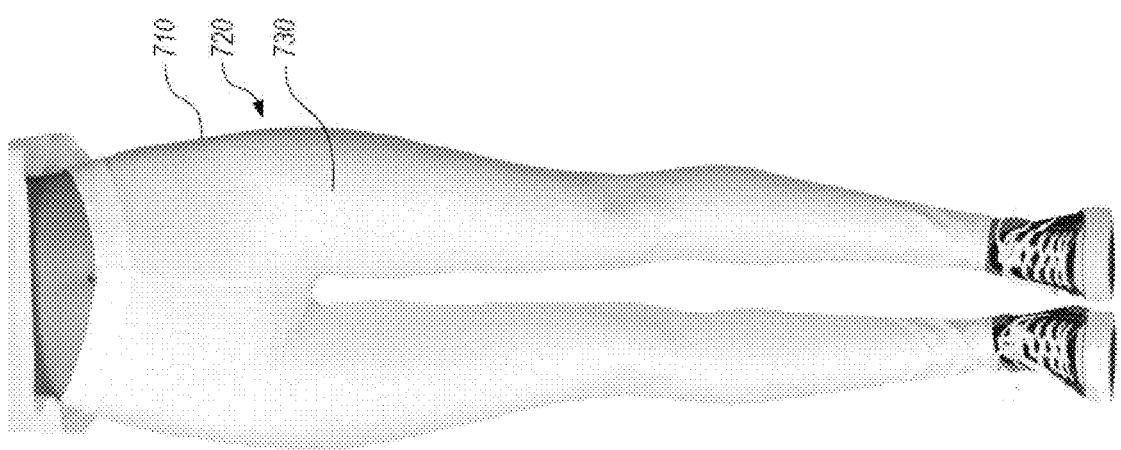
FIG. 7 illustrates an example digital reference image.

FIG. 7 illustrates an example digital reference image. The example depicts a digital reference image of a pair of leggings 710 featured on a model 720. Pair of leggings 710 is depicted in such a way that the front and the back of the leggings wrap around model 720, and a leg of the leggings wraps around a leg of model 720, as depicted using element 730.

VI. Segmenting Digital Markups in Digital Reference Images

In step 1270, a digital reference image is digitally processed to segment any markup in the digital reference image. Segmenting a markup in an image is also referred to as recognizing the markup in the digital reference image.

In an embodiment, a digital reference image is analyzed using an electronic device to recognize markups depicted in the image. Recognizing markups in a digital reference image presents many challenges. For example, the markups may not be clearly visible in a digital reference image. Furthermore, it may be difficult to distinguish an edge or an element of a markup in a region in which seams of the reference product are depicted, or in a region in which the reference product wraps around a mannequin and thus it is only partially visible on the digital reference image.

Also, it may be difficult to recognize a markup in a digital reference image if the image has a low contrast between the markup imprinted in the digital reference image and regions that do not include markups. Moreover, it may be difficult to recognize a markup in a digital reference image if the image has a poor quality, a low resolution, a low contrast, or a low brightness. In addition, a digital reference image may include so many different elements that recognizing a markup in the image may be quite difficult. Furthermore, a digital reference image may include not one, but a plurality of markups. Therefore, the process of recognizing a markup in a digital reference image may be sometimes repeated several times until one or more markups are segmented in the image.

A. Segmenting a Digital Markup Using a Color-Filtering Approach

Figure 8:
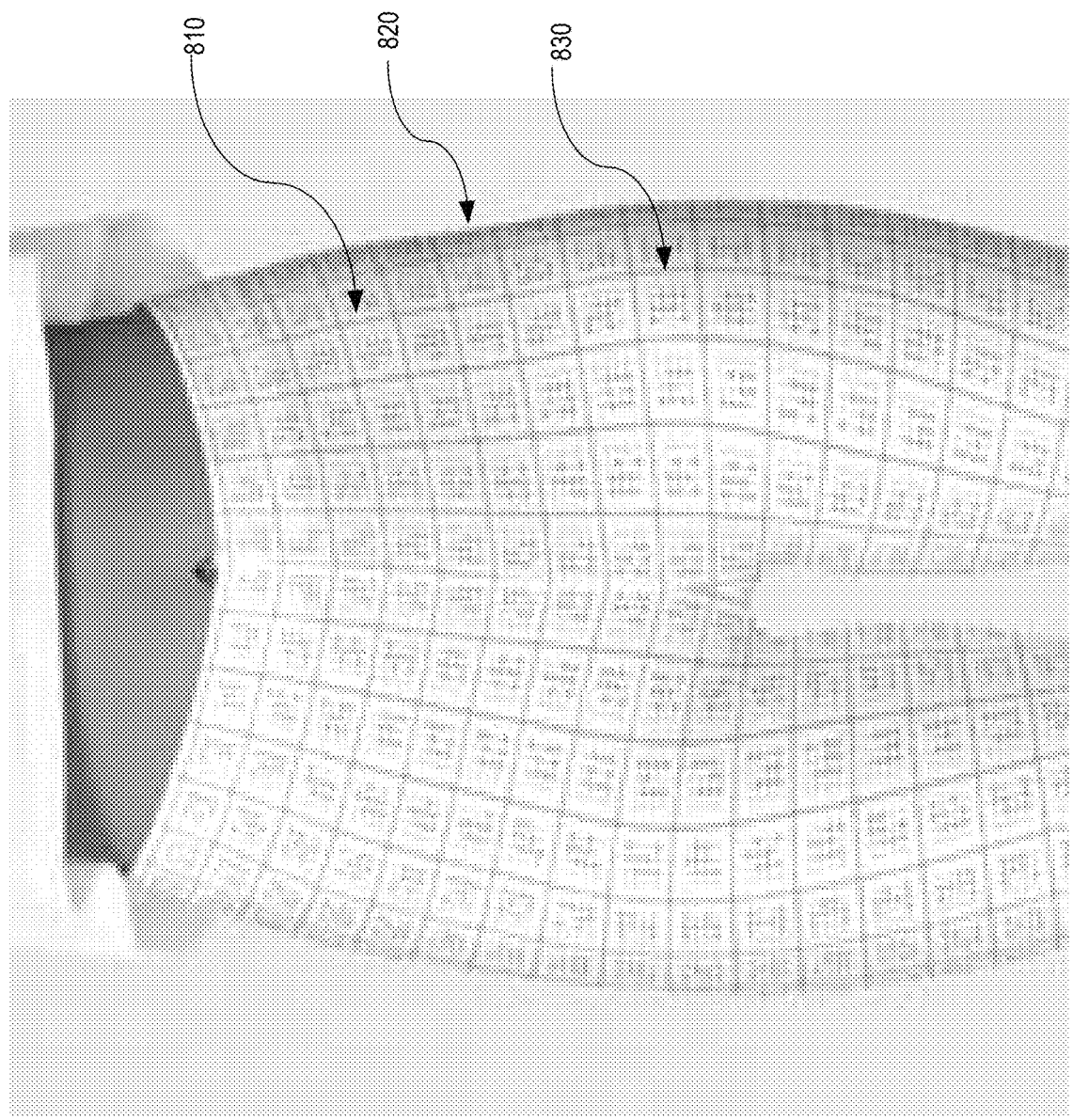
FIG. 8 illustrates an example digital reference image to be processed using a color filtering approach to determine a digital markup imprinted in the image.

FIG. 8 illustrates an example digital reference image to be processed using a color filtering approach to determine a digital markup imprinted in the image. The example depicts a digital reference image of a pair of leggings 810 featured on a model 820. Pair of leggings 810 is depicted in such a way that the front and the back of the leggings wrap around model 820, and each leg of the leggings wraps around the model's leg. The example depicts that the leggings wraps around a right leg of model 820, as depicted using an element 830.

In an embodiment, a digital reference image is processed to determine a plurality of distinct regions in the digital layout image. The distinct regions may be determined in the digital layout image by analyzing color values for the digital layout image and determining the distinct regions that include the color values that are different than the color values of other regions. For example, if a digital reference image depicts a pair of white leggings 820 with black (or yellow) printing on it, then the digital reference image may be processed to identify a plurality of distinct regions that include the back (or yellow) printing, and not the white regions.

In an embodiment, a digital reference image is processed to determine a plurality of distinct regions in the digital layout image based on color and color differences in the digital reference image. Using this approach, a product image may be partitioned into different regions based in part on color differences. For example, each location of the product markup image input image may be assigned a color difference value indicating how different the location is from neighboring locations in terms of color. Each location may be assigned an image region of the plurality of image regions, and locations may be considered for region assignments according to an order that is based, at least in part, on the color difference value assigned to the pixel. For example, locations with low associated color difference values may be assigned regions before locations with high associated color difference values. This approach may be referred to as a color shed approach.

In an embodiment, region information determined based in visualization of a customizable product in a digital reference image allows determining a position of particular markup portions in the digital reference image. Based on the determined positions, an image processing system may determine instructions for rendering computer-generated visualization of the customized products. The region information may also be utilized to verify the quality of a customized product after the customized product has been manufactured.

In an embodiment, a digital reference image may be partitioned into a plurality of image regions. The partitioning processes may result in partitioning at least the markup portion of the digital reference image into a set of regions, where each region of the set of regions represents a portion of the markup.

In an embodiment, an image partitioning process may result in determining regions information that identifies, for example, for each found region, the image locations that belong to the region. The information may also include descriptions of the area of each region, and/or the representative color of the region. In some embodiments, each image location corresponds to a separate pixel. In other embodiments, each image location is a group of pixels, or a markup element.

In an embodiment, the resulting region information is utilized in the automatic visualization of a custom product, which may be customized according to customer-provided parameters.

Figure 13:
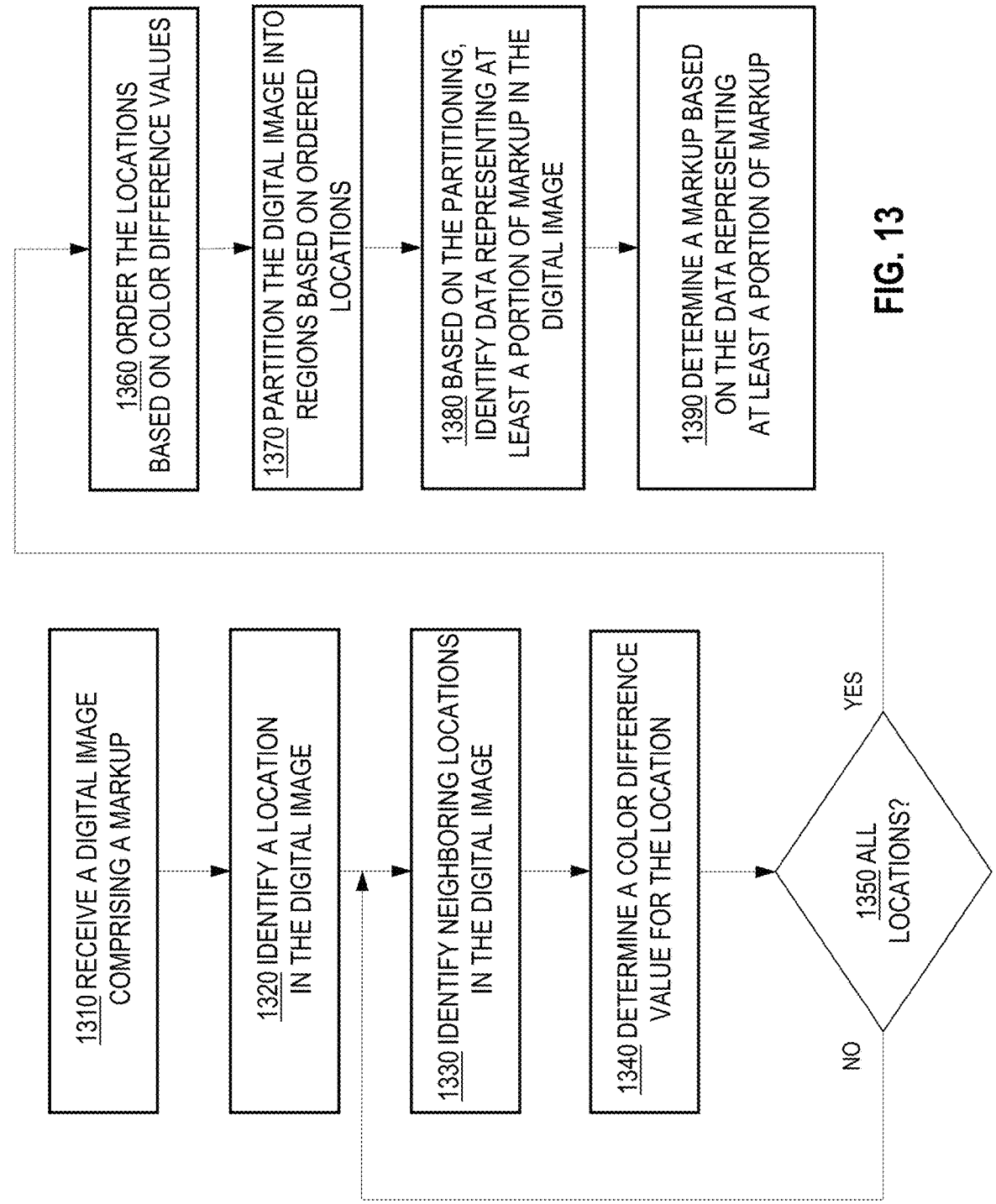
FIG. 13 illustrates an example process for identifying markups in digital reference images using a color filtering approach.

FIG. 13 illustrates an example process for identifying markups in digital reference images using a color filtering approach.

In step 1310, a digital image comprising a markup is received. The digital image may correspond to a digital reference image described above.

In step 1320, one or more locations in the digital image are identified. A location identified in the digital image may be a group of pixels or just a pixel. Hence, a location may correspond to either a group of pixels or an individual pixel.

In step 1330, one or more neighboring locations that neighbor to a particular location in a digital image are identified. If locations include groups of pixels, then for a particular location, one or more neighboring locations adjacent to the particular location include groups of pixels. If locations include individual pixels, then for a particular location, one or more neighboring pixels adjacent to the particular location are just individual pixels.

In step 1340, a color difference value for each of the locations is determined. For example, for a particular location, a particular color value for the particular location and color values for the neighboring locations are determined, and an average value of differences between the particular color values and the neighboring color values is determined. The color difference value may also be determined using other approaches.

The process of determining a color difference value for each location is repeated for each location identified in the digital image.

If in step 1350, if is determined that the process has been repeated for all locations identified in the digital image, then step 1360 is performed. Otherwise, steps 1330-1340 are repeated for the remaining locations.

In step 1360, the locations identified in the digital image are ordered according to the color difference values determined for the locations.

In step 1370, the digital image is partitioned based on the ordered locations into one or more regions. The partitioning includes assigning, to each location, an image region of the plurality of image regions. The assignment between the locations and regions may be performed according to an order that is based, at least in part, on the color difference value assigned to the pixel. For example, locations with low associated color difference values may be assigned regions before locations with high associated color difference values.

By assigning regions to locations based on respective color difference values determined for the locations, the locations with low color difference values (i.e., the locations that are very similar to their surrounding locations) may be more likely to be at the center of the determined regions or in other non-border locations of the regions. Such an image partitioning approach may cause the resulting partitioned image to be partitioned into regions that are more uniformly-colored than regions determined according to other approaches.

In step 1380, based on the partitioning, data is identified that represents at least a portion of a markup in the digital image.

It is possible that only a portion of the markup, not the entire markup, is identified in a digital reference image. This may happen because some markups may not be clearly visible in the digital reference image. Furthermore, this may happen because it may be difficult to distinguish an edge or an element of a markup in a region in which seams of the reference product are depicted. This may also happen in a region in which for example, the reference product wraps around a mannequin and thus it is only partially visible on the digital reference image.

In step 1390, a particular markup is identified based on the data representing at least a portion of the markup. Different approaches may be implemented to identify a particular markup based on the data representing at least a portion of the markup using the data representing at least a portion of the markup. One approach includes generating a mapping between found markup regions and regions identified of a digital markup image.

Other approaches for identifying at least a portion of the markup imprinted on a digital reference image may include determining a distance value between locations. A distance value may be determined for example, as a difference between the color of a pixel in a digital reference image and the color of a digital markup image in a particular color space. The distance values may be computed for each pixels in a digital reference image, and a region may be created based on a group of pixels for which the respective color differences are the smallest.

Another approach for determining a markup region in a digital reference image may use a color spatial frequency approach. This approach may include computing a bandpass determined based on the dot sized in a digital markup image and comparing the bandpass with the characteristics of the pixels of the digital reference image.

Referring again to FIG. 12, in step 1280, one or more found markup regions are identified in a digital reference image. The found markup regions are the regions that most likely, or with some certainty, include at least a portion of a markup.

B. Building a List of Markup Identifiers

In an embodiment, one or more found markup regions are used to build a list of MarkupIDs of markups potentially included in the found markup regions.

In an embodiment, for each found markup region, of one or more found markup regions identified in a digital reference image, a list of MarkupIDs is generated. A list of MarkupIDs for a particular found markup region identified in a digital reference image is a list that includes identifiers of markups that are included in the particular found markup region of the digital reference image, or may be included in the particular found markup region of the digital reference image. For example, a particular found markup region may include one or more markups, one or more portions of one or more markups, one or more portions of one markup and a depiction of entire another markup, and so forth.

A list of MarkupIDs generated for a particular found markup region may be any type of data structure, such as a data table, a data index, a data space region indexed using pointers, and so forth.

In an embodiment, a list generated for a particular found markup region comprises a MarkupID of a particular digital markup image, a position information of the particular found markup region within a digital reference image, and any additional metadata that may be used to identify the particular digital markup image. A list for a particular found markup region may include more than one MarkupID if more than one digital markup image may be included in the particular found markup region.

A list comprising MarkupIDs may be generated for a particular found markup region if the particular found markup region meets certain conditions. For example, a test may be performed to determine whether a particular found markup region is a valid region. The test may include checking a size of the dots included in the found markup region, a size of the areas between the dots, and the like.

A particular MarkupID may be included in a list for a particular found markup region if the particular MarkupID meets certain criteria. For example, a test may be performed to determine whether a checksum of the particular MarkupID is valid. As described below, a checksum of a markup may be defined by a count of dots in the vertical direction and/or a count of dots in the horizontal directions. For example, if the markup is expected to have five dots horizontally and five dots vertically, then a checksum of the markup is 5×5. Testing the checksum of the markup may involve testing whether the markup has the checksum of 5×5.

A particular MarkupID may be included in a list for a particular found markup region if the particular MarkupID corresponds to a markup that has acceptable extents defined in terms of dots in a markup pattern of the markup. This may include rotations of the markup elements within the markup pattern. Based on extents, a markup transformation for the markup may be generated and used to determine and verify a map of the markup dots.

A particular MarkupID may be included in a list for a particular found markup region if a digital signature of a corresponding markup is acceptable or correct. A digital signature of a markup may be defined as a count of regions distinguishable in the markup. For example, if a markup includes 16 tiles of markup elements, then a digital signature of that markup may be 16. Testing a digital signature of a markup may include determining whether the markup indeed includes 16 tiles.

Generating a list of MarkupIDs for a particular found markup region may include determining a rotation for a markup associated with a MarkupID. Some markups may be expressed using one or more rotation parameters. An example of such a markup is described in FIG. 11.

In an embodiment, additional information about a markup may be obtained or generated before a MarkupID of the markup is included in a list of MarkupIDs for a found markup region. For example, a rotation information of the marker may be obtained and included in the list. Furthermore, surface derivatives may be computed based on a spacing of dot centers within the found markup region may be calculated. Moreover, the corrected markup region geometry may be calculated using the information about the markup transformation and the information about the surface derivatives, and included in the list.

In step 1290, one or more reference markup regions identified in a digital markup image are mapped onto one or more found markup regions identified in a digital reference image. The resulting mapping may be referred to as a region mapping.

In an embodiment, one or more reference markup regions are identified in a digital markup image. This may be performed before a digital markup layout is sent to a manufacturer, or when a digital markup image is generated and stored.

In an embodiment, one or more reference markup regions are identified in a digital markup image by dividing the digital markup image into one or more areas corresponding to individual markup elements. For example, if a markup includes four markup elements repeated horizontally and four markup elements repeated vertically, then the markup may be divided into 16 areas, which may be equated to one or more reference markup regions.

For each reference markup region, of one or more reference regions, a position of the reference markup region within a digital reference image and extents of the reference markup region may be identified.

In an embodiment, a list of reference markup regions for a digital markup image is created. A list of reference markup regions may include information about the regions identified within the digital markup image. For each reference markup region identified in a digital markup image, a list may include a MarkupID of the markup, information about the position and extents of the markup region.

Once lists of reference markup regions for a digital markup image is created, the regions of the markups may be mapped onto one or more found markup regions identified in a digital reference image. The mapping may be performed by traversing the lists, and trying to match the characteristics of the reference markup region with the characteristics of found markup regions. The traversing and matching may be accelerated by using for example, data hashing techniques.

C. Generating a Geometry Mapping

In step 1292, a geometry map is generated. A geometry map may be generated based on a mapping between reference markup regions of markups and one or more found reference regions identified in a digital reference image.

In an embodiment, a geometry map is generated by building a set of polygons. A set of polygons may be determined based on reference markup regions identified in a markup and mapping the polygons onto one or more found reference regions identified in a digital reference image. Each vertex of a polygon may have an associated reference point in a reference markup region and a found marker point in a found reference region. A set of polygons may be build using the information in a list of reference markup regions for the markups, extents information for the markups, and adjacency information for the reference markup regions.

In an embodiment, a set of polygons determined for a geometry map includes information about the polygons that are adjacent to each other. The adjacency information for two polygons may be determined based on a distance between the centers of the polygons and based on a distance tolerance value. The geometry map may also include information about an average contributions of adjacent vertices of the neighboring polygons to each of the polygons.

In an embodiment, once a geometry map for a digital reference image is created, markups, or portions of the markups, may be removed from the digital reference image. Since the purpose of depicting a markup in a digital reference image is to register a reference points of the markup in the digital reference image, once a geometry map is created for the digital reference markup, a further processing of the digital reference markup may be performed on an image in which the markups have been removed.

VII. Generating an Interactive Asset Image

In step 1294, an interactive asset is rendered from an unmarked digital image. This may include processing a digital reference image by removing any marking. An example of the process is described in FIG. 9.

Figure 9:
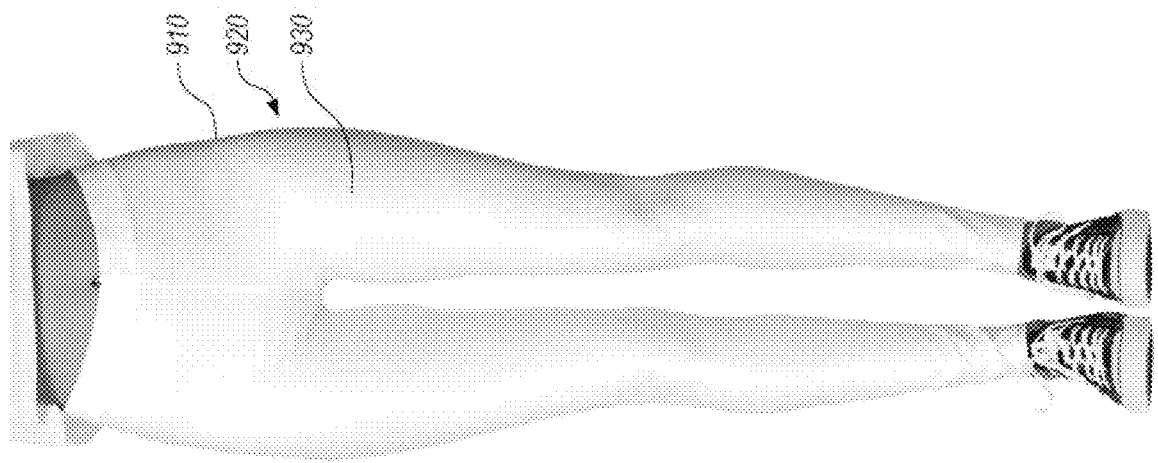
FIG. 9 illustrates an example image having markups removed.

FIG. 9 illustrates an example image having markups removed. The example depicts a pair of leggings 910 featured on a model 920. In contrast to a pair of leggings depicted in FIG. 8, the leggings in FIG. 9 do not have any imprinted marking. For example, if the leggings in FIG. 8 were white with a yellow imprinted marking, then the leggings in FIG. 9 show a white pair of leggings with no yellow marking.

In FIG. 9, a pair of leggings 910 is depicted in such a way that the front and the back of the leggings wrap around model 920, and each leg of the leggings wraps around the model's leg. The example depicts that the leggings wraps around a right leg of model 920, as depicted using an element 930.

In an embodiment, an unmarked digital image is used as an interactive asset image. The interactive asset image may have the same shape and size characteristics and the unmarked digital image. Furthermore, the interactive asset image may have the same background characteristics and the unmarked digital image.

VIII. Generating a Customized Product Image

In an embodiment, an interactive asset image is further processed. The further processing may include applying a user pattern to the interactive asset image to generate a customized product image. For example, if an interactive asset image depicts a pair of leggings, the interactive asset image may be interactively customized by allowing a user to apply a custom pattern to the leggings and generate an image of the customized product. The customization may allow for deforming the customized pattern in the customized product image in the same fashion as a digital markup image was deformed on some surfaces of the digital reference image described above.

In step 1296, a user pattern is mapped onto an interactive asset according to a geometry mapping to generate a customized product image. A user pattern may be for example, a customized pattern generated by a customer who designs the interactive asset using a web site application. A user pattern may also be a customized pattern generated by a web developer who designs different customization options that may be available to customers who access the website.

In an embodiment, a customization of an interactive asset image using a user pattern allows for deforming the user pattern in a customized product image in the same fashion as a digital markup image was deformed on some surfaces of the digital reference image.

In an embodiment, a customization of an interactive asset image using a user pattern includes encoding means for rendering an unmarked digital image into an interactive asset, and encoding means for mapping a user pattern or image in a photo-real manner using a geometry map onto an interactive asset image.

Figure 10:
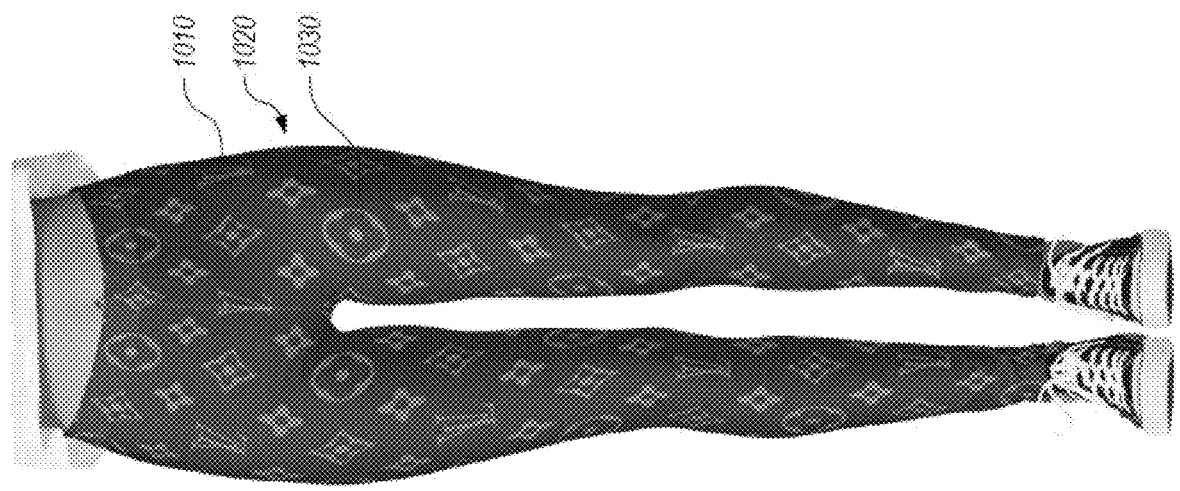
FIG. 10 illustrates an example customized product image that is rendered by applying a user pattern to an interactive asset image.

FIG. 10 illustrates an example customized product image that is rendered by applying a user pattern to an interactive asset image. The figure depicts a pair of leggings 1010 modelled by a model 1030. Pair of leggings 1010 has a user-defined pattern imprinted on the garment. Noticeably, the user pattern is deformed in the customized product image in the same fashion as a digital markup image was deformed on the surfaces of the digital reference image depicted in FIG. 7. In particular, pair of leggings 1010 is depicted in such a way that the front and the back of the leggings wrap around model 1020, and a leg of the leggings wraps around a leg of model 1020, as depicted using element 1030.

In an embodiment, an approach for customizing digital images provides an automated method for realistically visualizing customized image. The approach includes encoding a digital signature in markups used to manufacture reference products.

In an embodiment, an approach includes processes that allow imprinting markups on a product manufactured with specified colors and patterns. The methods allow detecting specific marked-up regions in a digital reference image, find the position and orientation of these regions, apply photorealistic visualization of customized patterns to the product, and display digital images of the customized product.

The processes work well when at least a portion of the markups is visible in a digital reference image. For example, the software algorithm used for finding the markup in a digital reference image may be fully automated when the markup is well-visible in a digital reference image, or when only a small portion of the markup is visible.

In an embodiment, techniques for detecting and mapping digital markers onto digital reference image may be implemented in specialized program application. The application may be encoded using open source computer vision projects, such as the openCV.

In an embodiments, an approach for using digital markups to customize products is implemented in an Augmented Reality system. The system may be calibrated using a set of digital markup images and other calibration techniques. For example, a digital marker boundary frame maybe used to provide a coordinate frame that allows identifying the marker in an image. Markers used to calibrate the Augmented Reality system are usually presented on a flat or non-deformed surface to allow an efficient identification and mapping of the markup. In an embodiment, digital markers is encoded using various techniques, including QR codes.

IX. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 14:
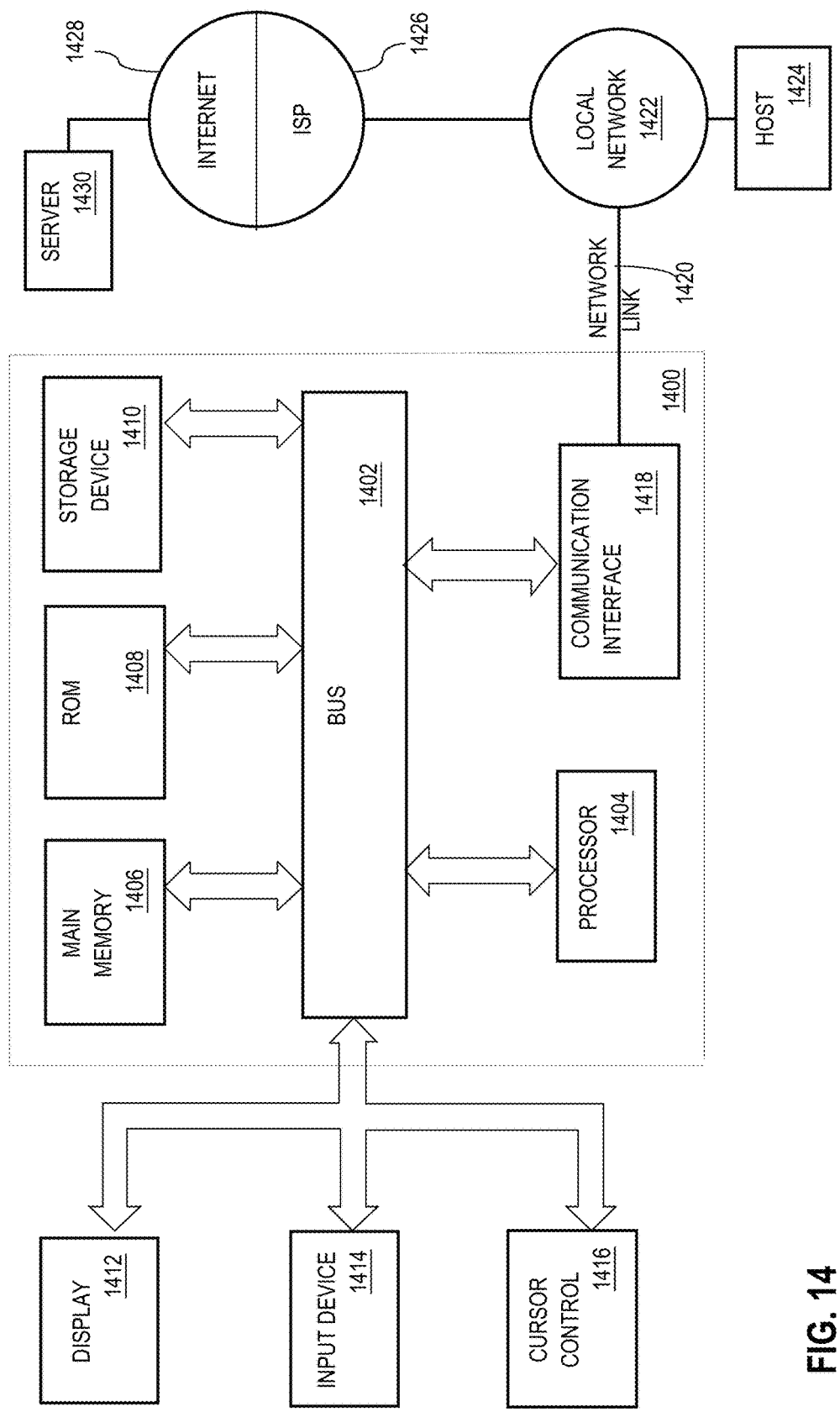
FIG. 14 is a block diagram that illustrates a computer system upon which an embodiment of the invention may be implemented.

For example, FIG. 14 is a block diagram that illustrates a computer system 1400 upon which an embodiment of the invention may be implemented. Computer system 1400 includes a bus 1402 or other communication mechanism for communicating information, and a hardware processor 1404 coupled with bus 1402 for processing information. Hardware processor 1404 may be, for example, a general purpose microprocessor.

Computer system 1400 also includes a main memory 1406, such as a random access memory (RAM) or other dynamic storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 into a special-purpose machine that is customized to perform the operations specified in the instructions.

Computer system 1400 further includes a read only memory (ROM) 1408 or other static storage device coupled to bus 1402 for storing static information and instructions for processor 1404. A storage device 1410, such as a magnetic disk, optical disk, or solid-state drive is provided and coupled to bus 1402 for storing information and instructions.

Computer system 1400 may be coupled via bus 1402 to a display 1412, such as a cathode ray tube (CRT), for displaying information to a computer user. An input device 1414, including alphanumeric and other keys, is coupled to bus 1402 for communicating information and command selections to processor 1404. Another type of user input device is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane.

Computer system 1400 may implement the techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1410. Volatile media includes dynamic memory, such as main memory 1406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or solid-state drive of a remote computer. The remote computer can load the instructions into its dynamic memory and send the instructions over a telephone line using a modem. A modem local to computer system 1400 can receive the data on the telephone line and use an infra-red transmitter to convert the data to an infra-red signal. An infra-red detector can receive the data carried in the infra-red signal and appropriate circuitry can place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

Computer system 1400 also includes a communication interface 1418 coupled to bus 1402. Communication interface 1418 provides a two-way data communication coupling to a network link 1420 that is connected to a local network 1422. For example, communication interface 1418 may be an integrated services digital network (ISDN) card, cable modem, satellite modem, or a modem to provide a data communication connection to a corresponding type of telephone line. As another example, communication interface 1418 may be a local area network (LAN) card to provide a data communication connection to a compatible LAN. Wireless links may also be implemented. In any such implementation, communication interface 1418 sends and receives electrical, electromagnetic or optical signals that carry digital data streams representing various types of information.

Network link 1420 typically provides data communication through one or more networks to other data devices. For example, network link 1420 may provide a connection through local network 1422 to a host computer 1424 or to data equipment operated by an Internet Service Provider (ISP) 1426. ISP 1426 in turn provides data communication services through the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

Computer system 1400 can send messages and receive data, including program code, through the network(s), network link 1420 and communication interface 1418. In the Internet example, a server 1430 might transmit a requested code for an application program through Internet 1428, ISP 1426, local network 1422 and communication interface 1418.

The received code may be executed by processor 1404 as it is received, and/or stored in storage device 1410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer implemented method comprising:
   receiving, at an electronic device, a digital markup image that has one or more reference markup regions, and is associated with a markup identifier;
   receiving, at the electronic device, a digital layout image that represents a form of a product used to manufacture a reference product;
   generating, using the electronic device, a digital markup layout by overlaying the digital markup image over the digital layout image;
   based on, at least in part, the digital markup layout, generating one or more manufacturing files comprising digital data usable in manufacturing the reference product;
   receiving, at the electronic device, a digital reference image of the reference product that has been manufactured based on, at least in part, the one or more manufacturing files;
   identifying one or more found markup regions in the digital reference image;
   determining a region mapping that maps one or more of the one or more reference markup regions to the one or more found markup regions;
   based on, at least in part, the region mapping, generating a geometry map;
   generating an interactive asset image by removing the one or more found markup regions from the digital reference image;
   based on, at least in part, the region mapping and the geometry map, generating a customized product image by applying a user pattern to the interactive asset image;
   causing the customized product image to be displayed on a display device.

2. The method of claim 1, further comprising: determining a checksum for the digital markup image; generating a plurality of digital pattern images that have the checksum embedded in each digital pattern image; based on the plurality of digital pattern images, generating a plurality of rotated digital pattern images; selecting a subset of the plurality of rotated digital pattern images; generating the digital markup image based on the subset of the plurality of rotated digital pattern images; wherein no two patterns in the subset of the plurality of rotated digital pattern images are identical.

3. The method of claim 1, further comprising: determining a checksum for the digital markup image; generating a digital pattern image that has the checksum embedded in the digital pattern image.

4. The method of claim 1, further comprising: generating the markup identifier based on contents of the digital markup image; storing the digital markup image in an association with the markup identifier in a markup index data structure.

5. The method of claim 1, further comprising: determining a plurality of distinct regions in the digital layout image; for each distinct region of the plurality of distinct regions, overlaying the digital markup image onto a distinct region.

6. The method of claim 1, further comprising: segmenting the digital reference image into the one or more found markup regions by performing one or more of: applying a color shed approach to the digital reference image, determining distance values between color values in areas of interest in the digital reference image and color values in a reference photograph, generating a spatial frequency histogram for the digital reference image, or generating a bandpass histogram for the digital reference image.

7. The method of claim 6, further comprising:
based on color characteristics, partitioning the digital reference image into a plurality of image regions by performing:
assigning a color difference value to each location of a plurality of locations within the digital reference image;
wherein a particular color difference value assigned to a particular location is determined based in part on the digital reference image and indicates how different a color of the particular location is from colors of other locations neighboring the particular location;
assigning each location of the plurality of locations to an image region of the plurality of image regions according to a particular order;
wherein the particular order is based at least in part on color difference values associated with the plurality of locations;
selecting a particular image region to be assigned to a location based on, at least in part, a color assigned to the location;
wherein the color assigned to the location is determined based on, at least in part, the digital reference image;
based on the partitioning, determining data representing at least a particular portion of a markup in the digital reference image.

8. The method of claim 1, wherein the geometry map maps, for the one or more found markup regions, a reference point of a particular found markup region to a reference point of a particular reference markup region.

9. The method of claim 1, wherein the geometry map comprises a plurality of polygons; wherein each polygon of the plurality of polygons includes a plurality of vertices describing a relation between a particular found markup region and a particular reference markup region.

10. The method of claim 1, further comprising: generating a list of markups for the one or more found markup regions.

11. An image processing computing system comprising:
a layout manager configured to: receive a digital markup image that has one or more reference markup regions, and is associated with a markup identifier; receive a digital layout image that represents a form of a product used to manufacture a reference product; generate a digital markup layout by overlaying the digital markup image over the digital layout image;
a manufacturing file generator configured to: based on, at least in part, the digital markup layout, generate one or more manufacturing files comprising digital data usable in manufacturing the reference product;
a reference product manager configured to: receive a digital reference image of the reference product that has been manufactured based on, at least in part, the one or more manufacturing files;
a markup regions generator configured to: identify one or more found markup regions in the digital reference image; determine a region mapping that maps one or more of the one or more reference markup regions to the one or more found markup regions;
a geometry map builder configured to: based on, at least in part, the region mapping, generate a geometry map;
an interactive asset builder configured to: generate an interactive asset image by removing the one or more found markup regions from the digital reference image; based on, at least in part, the region mapping and the geometry map, generate a customized product image by applying a user pattern to the interactive asset image; cause the customized product image to be displayed on a display device.

12. The image processing computing system of claim 11, further comprising a digital markup generator configured to: determine a checksum for the digital markup image; generate a plurality of digital pattern images that have the checksum embedded in each digital pattern image; based on the plurality of digital pattern images, generate a plurality of rotated digital pattern images; select a subset of the plurality of rotated digital pattern images; generate the digital markup image based on the subset of the plurality of rotated digital pattern images; wherein no two patterns in the subset of the plurality of rotated digital pattern images are identical.

13. The image processing computing system of claim 12, wherein the digital markup generator is further configured to: determine a checksum for the digital markup image; generate a digital pattern image that has the checksum embedded in the digital pattern image.

14. The image processing computing system of claim 12, wherein the digital markup generator is further configured to: generate the markup identifier based on contents of the digital markup image; store the digital markup image in an association with the markup identifier in a markup index data structure.

15. The image processing computing system of claim 12, further comprising a markup segmenting unit configured to: determine a plurality of distinct regions in the digital layout image; for each distinct region of the plurality of distinct regions, overlay the digital markup image onto a distinct region.

16. The image processing computing system of claim 15, wherein the markup segmenting unit is further configured to: segment the digital reference image into the one or more found markup regions by performing one or more of: applying a color shed approach to the digital reference image, determining distance values between color values in areas of interest in the digital reference image and color values in a reference photograph, generating a spatial frequency histogram for the digital reference image, or generating a bandpass histogram for the digital reference image.

17. The image processing computing system of claim 16, wherein the markup regions generator is further configured to:
based on color characteristics, partition the digital reference image into a plurality of image regions by performing:
assign a color difference value to each location of a plurality of locations within the digital reference image;
wherein a particular color difference value assigned to a particular location is determined based in part on the digital reference image and indicates how different a color of the particular location is from colors of other locations neighboring the particular location;
assign each location of the plurality of locations to an image region of the plurality of image regions according to a particular order;
wherein the particular order is based at least in part on color difference values associated with the plurality of locations;
select a particular image region to be assigned to a location based on, at least in part, a color assigned to the location;
wherein the color assigned to the location is determined based on, at least in part, the digital reference image;
based on the partitioning, determine data representing at least a particular portion of a markup in the digital reference image.

18. The image processing computing system of claim 12, wherein the geometry map maps, for the one or more found markup regions, a reference point of a particular found markup region to a reference point of a particular reference markup region.

19. The image processing computing system of claim 12, wherein the geometry map comprises a plurality of polygons; wherein each polygon of the plurality of polygons includes a plurality of vertices describing a relation between a particular found markup region and a particular reference markup region.

20. The image processing computing system of claim 12, wherein the markup regions generator is further configured to: generate a list of markups for the one or more found markup regions.

\* \* \* \* \*